United States Patent [19]

Waller

[11] 4,432,310
[45] Feb. 21, 1984

[54] PARALLEL CYLINDER INTERNAL COMBUSTION ENGINE

[75] Inventor: Francis E. Waller, Clearwater, Fla.
[73] Assignee: Leonard J. E. Waller
[21] Appl. No.: 320,213
[22] Filed: Nov. 12, 1981

Related U.S. Application Data

[63] Continuation-in-part of Ser. No. 265,259, May 19, 1981, abandoned.

[51] Int. Cl.³ ............................................. F02B 75/26
[52] U.S. Cl. .................................. 123/58 AB; 91/502; 409/85; 409/95; 409/111; 74/567; 417/271; 417/269
[58] Field of Search ....... 123/58 AA, 58 AB, 43 AA; 409/111, 85, 95; 91/502; 74/567; 417/269, 271

[56] References Cited

U.S. PATENT DOCUMENTS

| | | | |
|---|---|---|---|
| 1,229,009 | 6/1917 | Allison | 123/58 AB |
| 1,351,365 | 8/1920 | Bower | 409/111 |
| 1,352,985 | 9/1920 | Murphy | 123/58 AA |
| 1,487,338 | 3/1924 | Kelley | 123/58 AB |
| 1,802,902 | 4/1931 | Brau | 123/58 AB |
| 2,027,076 | 1/1936 | Volliman | 123/58 AB |
| 2,237,621 | 4/1941 | Herrmann | 123/58 AB |
| 2,237,989 | 4/1941 | Herrmann | 123/58 AB |
| 2,243,817 | 5/1941 | Herrmann | 123/58 AB |
| 2,243,818 | 5/1941 | Herrmann | 123/58 AB |
| 2,243,819 | 5/1941 | Herrmann | 123/58 AB |
| 2,966,899 | 1/1961 | Herrmann | 123/58 AB |
| 3,456,630 | 7/1969 | Karlan | |
| 4,090,478 | 5/1978 | Trimble | 123/58 R |

FOREIGN PATENT DOCUMENTS

| | | | |
|---|---|---|---|
| 58995 | 8/1911 | Switzerland | 123/58 AA |
| 251607 | 4/1926 | United Kingdom | 123/58 AA |

Primary Examiner—Michael Koczo
Attorney, Agent, or Firm—Walter J. Monacelli

[57] ABSTRACT

The engine disclosed herein comprises a number of pairs of pistons, the two pistons in each pair acting in unison and the number of pairs being arranged parallel to each other and said pistons also being positioned parallel to and in a circle around the mainshaft which has a cam lobe located at a convenient part of the mainshaft and encircling the mainshaft. The cam lobe has opposite surfaces which have rises and dips, or in other words, sinusoidal surfaces, and are in contact with pairs of bearings attached to connecting rods, these bearings being on opposite sides of the cam lobe and at one time being driven in one direction by one of the two pistons in each pair and then at another time in the opposite direction by the other piston in that pair, the two pistons of that pair being connected to each other by the same connecting rod carrying the bearings which press against the cam lobe. The pressure exerted first by one bearing and then by the opposite bearing in concert with similar thrusts from other pairs of bearings and pistons, causes a steady, even rotation of the shaft on its linear axis. The action of the pistons and bearings is arranged and timed so that pressure against the surface of the cam lobe exerts vector forces against the curved surface of the cam lobe to effect rotation of the main shaft. Centerline thrust of the bearings against the cam surface and special design of the cam surface to avoid friction or binding between the bearings and the cam are special features of this engine. The pistons may be driven by combustion fuels, including gasoline, diesel, etc., and may also be adapted to steam operation. By appropriate changes, this engine may be operated as a compressor. The cam described herein is novel per se as well as the process and apparatus described for producing this cam.

14 Claims, 57 Drawing Figures

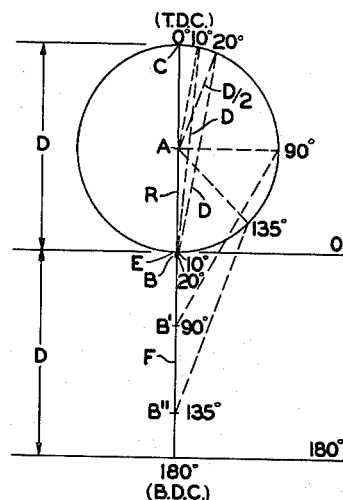
FIG. 1
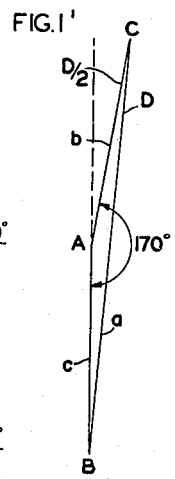
FIG. 1'
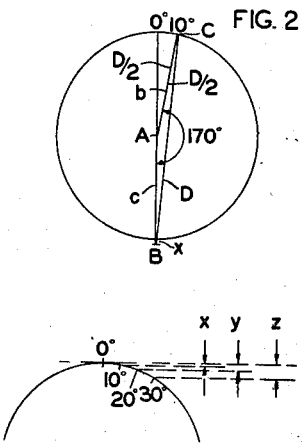
FIG. 2
FIG. 3
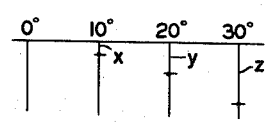
FIG. 4
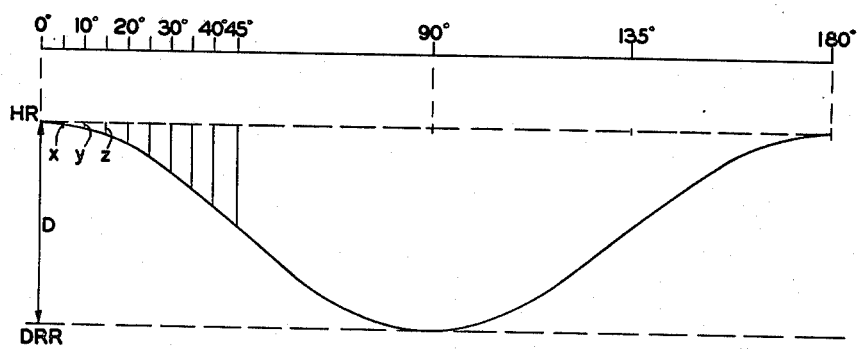
FIG. 5

DETERMINATION OF CONTACT POINTS OF CAM WITH OUTER EDGE OF BEARING

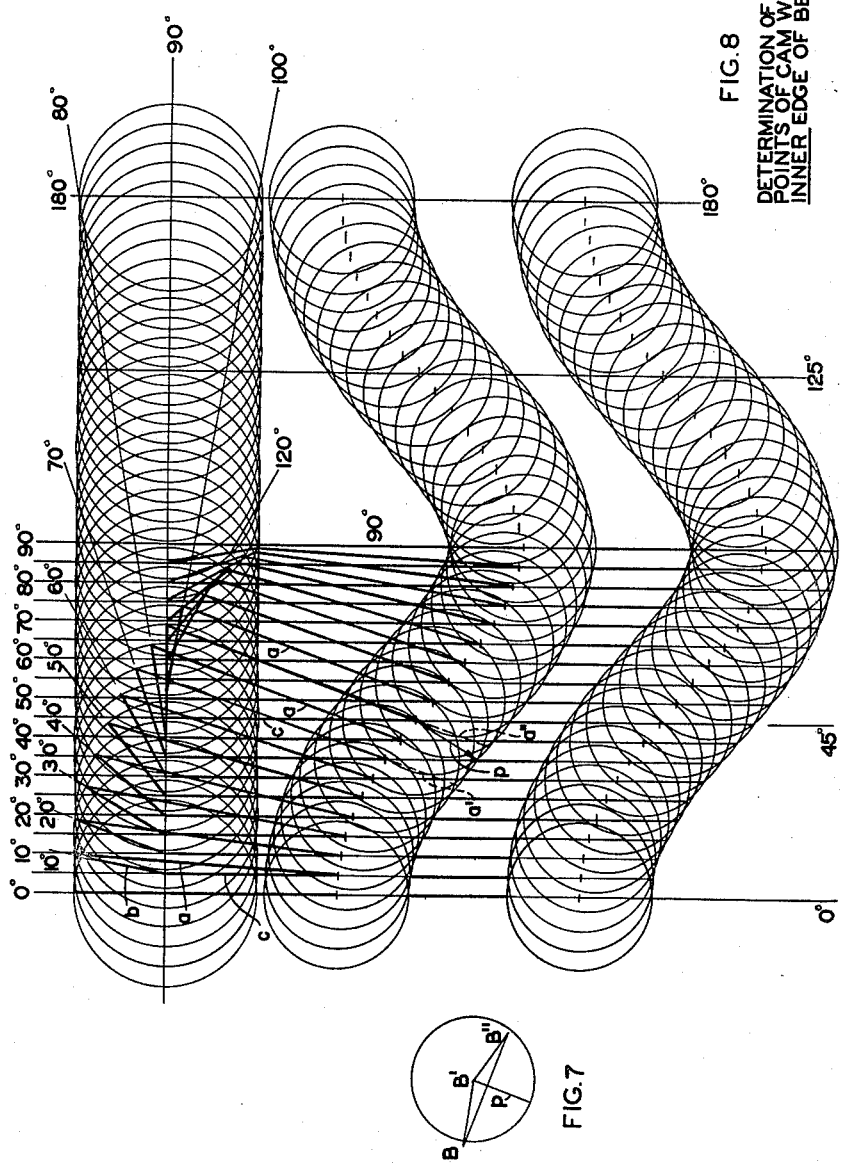

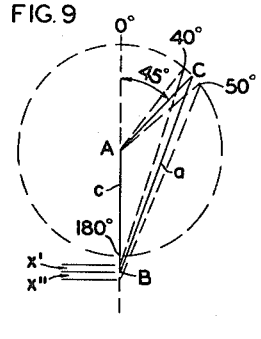
FIG.9
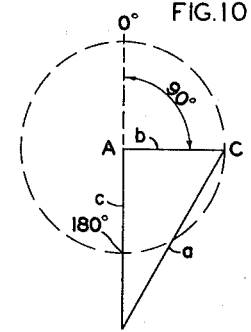
FIG.10
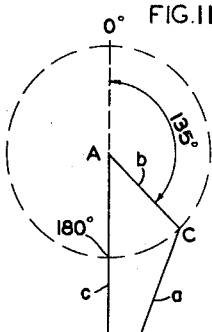
FIG.11
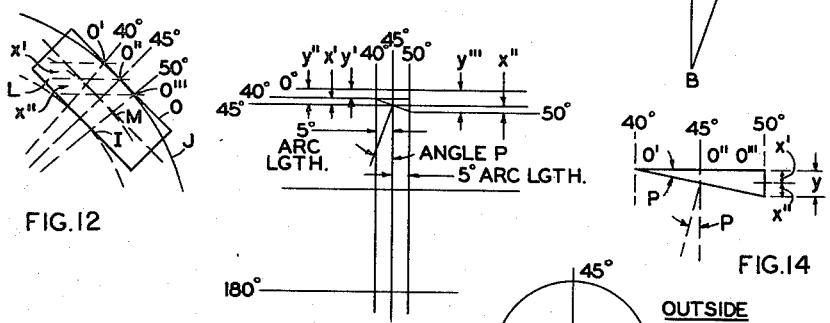
FIG.12
FIG.13
FIG.14
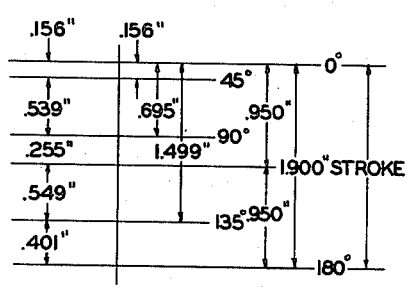
FIG.15
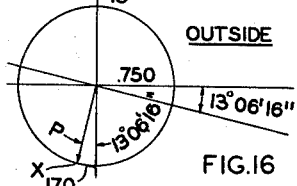
FIG.16 OUTSIDE
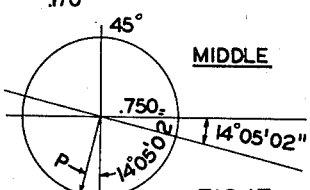
FIG.17 MIDDLE
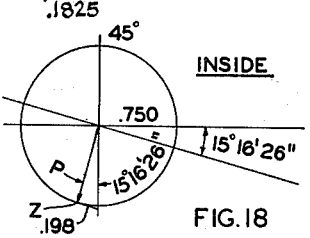
FIG.18 INSIDE

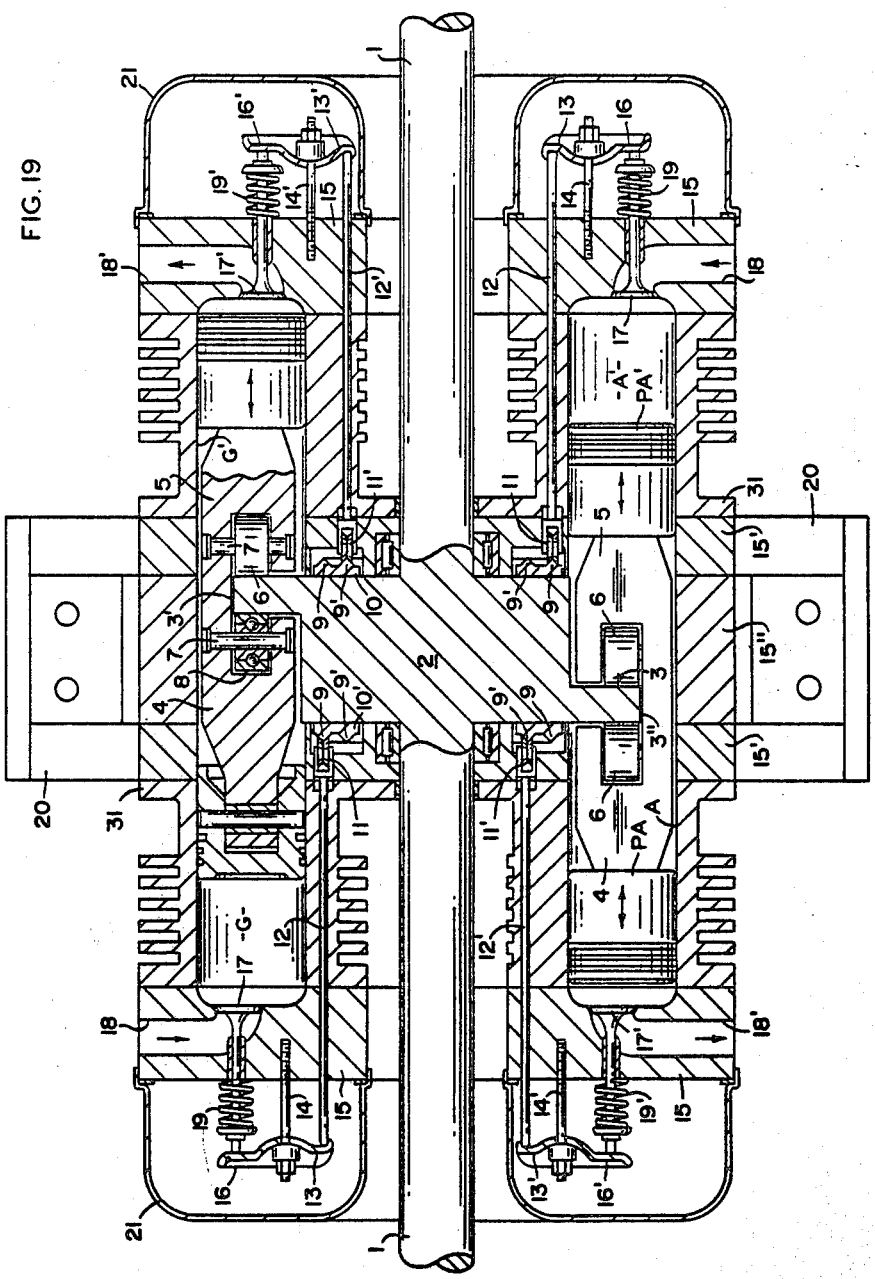

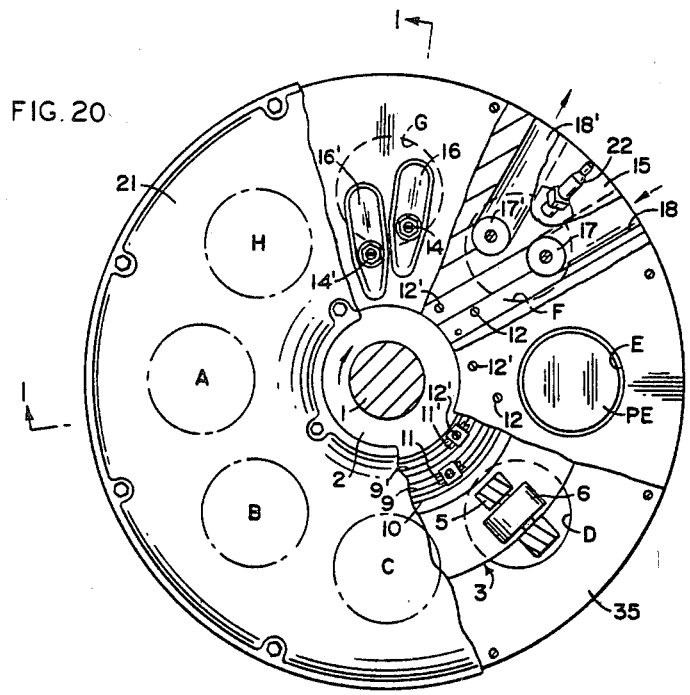
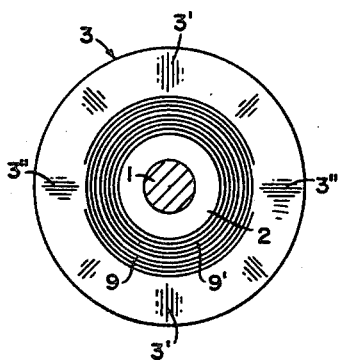
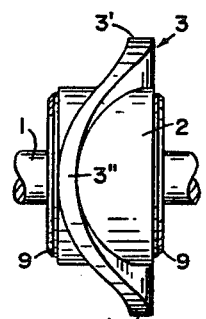
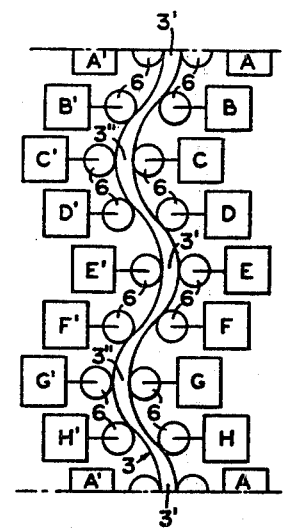

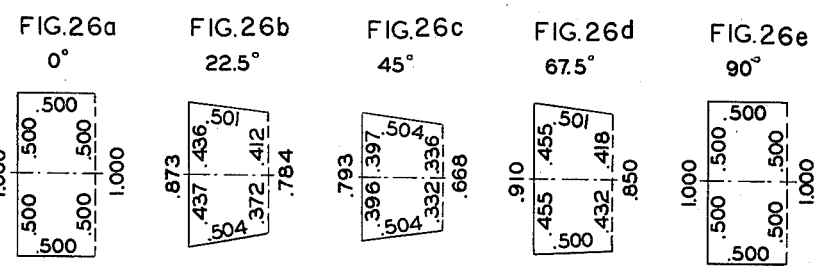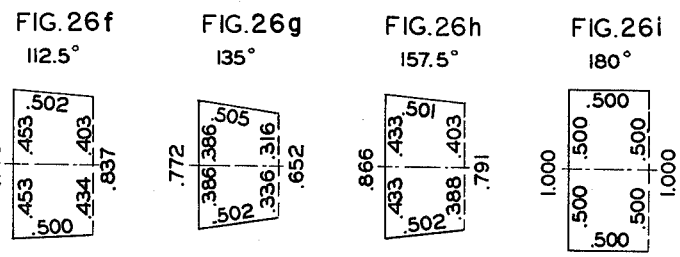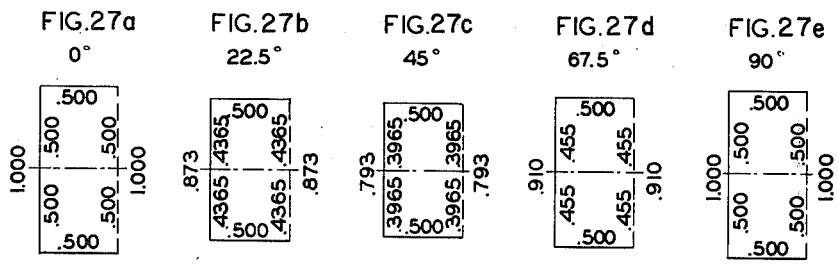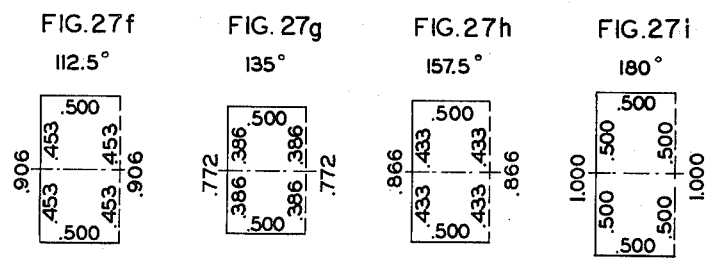

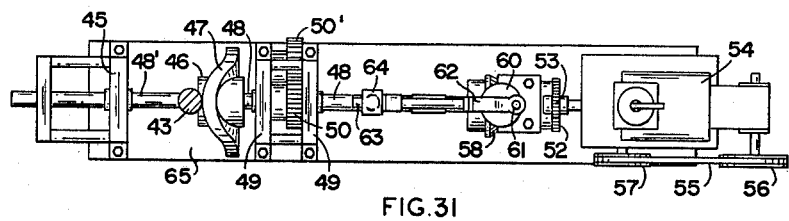
FIG.31
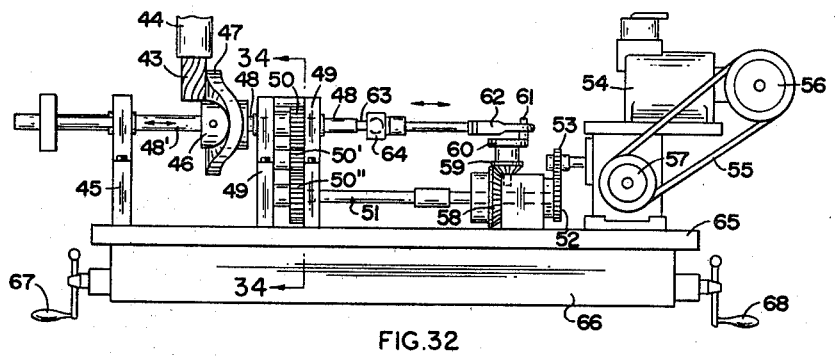
FIG.32
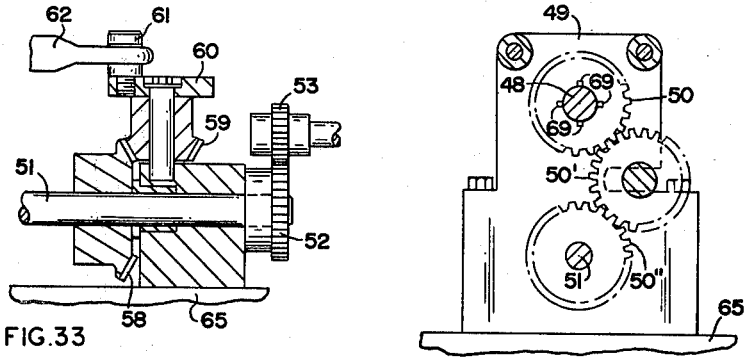
FIG.33
FIG.34
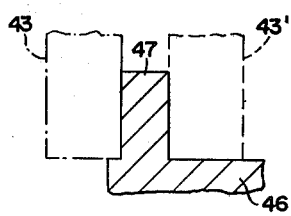
FIG.35

PARALLEL CYLINDER INTERNAL COMBUSTION ENGINE

This application is a continuation-in-part of application Ser. No. 265,259 filed May 19, 1981 abandoned, which in turn is a continuation of application Ser. No. 35,553 filed May 3, 1979, abandoned.

BACKGROUND OF THE INVENTION

1. Field of the Invention

This invention relates to a new type of parallel piston engine. More specifically it relates to a circular arrangement of pistons and cylinders around a mainshaft, which pistons act in concert to effect rotation of the mainshaft by virtue of pressure exerted on the sinusoidal surfaces of a cam lobe encircling the mainshaft. Still more specifically the cam surface is specially designed to avoid friction and binding between the bearings and cam surface.

2. State of the Prior Art

Various types of engines for developing mechanical power, such as for propelling vehicles, have been proposed and are in use. The most commonly used is the internal combustion engine. However, in spite of their widespread use, there are a number of disadvantages in the types of engines used, namely vibration, low efficiency, pollution, etc.

Vibration is generally due to the type of arrangement of the pistons with relation to the drive shaft, which in combination with poor timing, unequal power distribution, etc. is very inefficient in eliminating vibration although much has been done in absorbing vibration or otherwise eliminating its transmission to the passenger-riding portion of an automobile.

Since rotary engines may have pistons equally spaced around the mainshaft through which power is transmitted, it is conceivable that such engines might have less problems with vibration.

A number of patents have been published in which pistons are arranged parallel to a mainshaft which is driven by a cam rotated by the action of the pistons. However none of these have met with commercial success. Such patents are U.S. Pat. Nos. 1,229,009; 1,352,985; 1,487,338; 1,802,092; 2,027,076 and 2,966,899 and British Pat. No. 251,607 (1926). The lack of commercial success of the engines shown in these patents is believed to be due to a number of defects therein in which the designs do not provide for centerline thrust between the pistons, bearings and cam surface and the cam surfaces are not designed to avoid friction and binding between the bearings and the cam surfaces.

SUMMARY OF THE INVENTION

In accordance with the present invention, a parallel cylinder engine has been designed which operates with excellent fuel efficiency, little or no vibration, a minimum of exhaust pollution and a reduction of friction and freedom of binding between bearings and cam surfaces. This engine has multiple pistons and cylinders arranged parallel to and in a circle around a mainshaft. The pistons and cylinders are arranged in pairs, each pair having a common axis with a connecting rod connecting the two pistons. In a 2-cycle engine, one of the pistons in the pair goes through a firing cycle while its partner goes through a compression cycle and the two operate sequentially to drive the connecting rod back and forth along the common axis of the two cylinders.

In a preferred modification, each connecting rod has attached to it a pair of roller bearings each of which alternately presses and rides against a cam lobe encircling the mainshaft.

In this preferred modification, this cam lobe has two sinusoidal surfaces each having two symmetrically disposed high points or rises, and 90° from these high points there are corresponding low points or reverse rises with curved portions connecting these respective points. In other words, this cam lobe has two rises or high points 180° from each other and 90° from each high point there is a corresponding low point or a high point in the opposite direction (reverse rise) with curved sections connecting adjacent high and low points. While the surfaces of the cam lobe are sinusoidal, they are not parallel to each other since the thickness of the cam lobe varies between the rises as explained in greater detail hereinafter. Moreover, as explained hereinafter, the sinusoidal curves differ in slope from the outer edge of cam surface bearing-contact area as compared to the inner edge of the cam surface bearing-contact area, and also with respect to the center of the bearing-contact area, as explained hereinafter.

When a connecting rod moves in one direction in the path of its linear axis, one of the bearings carried by this connecting rod presses on the curved surface between a high and low point on the cam lobe, and by vector force, causes rotation of the mainshaft. In the automotive industry, a stroke of the piston or rod from one extreme position to its extreme position in the opposite direction is known as a stroke or cycle. Thus in going through intake, compression, power and exhaust, the piston and connecting rod goes through four strokes or cycles. With an engine having eight pairs of cylinders and pistons or 16 individual cylinders and pistons, there are 16 firings per revolution of the shaft which translates to 4 cycles per piston in one revolution of the mainshaft, and which results in a very smooth power transmission to the shaft with little or no vibration and with high efficiency.

An important feature of the engine of this invention is that the cam surface is designed to compensate for the friction and binding that results when a cylindrical bearing is rotated on a surface while the axis of the bearing is maintained in a position with its axis projected at a 90° angle to the axis of the mainshaft. Thus the outer edge of the bearing travels a path on the cam surface which has a greater circumferential distance than the path traveled by the inner edge of the bearing. However, since the two edges are on the same cylindrical surface, points on the otuer edge must travel the same distance as respective points on the inner edge. Therefore, in view of these differences in the circumferential paths of the two edges on the cam surface, friction and binding develops as the bearing is rotated. The engine of this invention has a novel cam surface design which compensates for this difference and by a "ratio compensation" design of this surface, avoids the friction and binding which otherwise develops. In this design, the centerline of the area of contact of the cam with a bearing is a sinusoidal curve whereas the lines of contact of the cam with the outer edge and inner edge of the bearing define lines respectively which are also sinusoidal curves but different from the centerline sinusoidal curve in that the outer sinusoidal curve has a lesser slope and the inner sinusoidal curve has a steeper slope relative to the centerline sinusoidal curve. This arrangement compensates by equalizing the ratio of the travel distance of the inner and outer edges of the bearing.

In addition to the novel design of this engine, the cam itself is considered novel as well as the process and apparatus described hereinafter for its production. Moreover, with the engine of this invention there are a number of other impotant advantages, First, as stated above, there are 16 firings per revolution of the mainshaft with four cycles or strokes for each piston whereas with the present 8 cylinder engine, there are only two cycles per revolution of the crankshaft.

Second, the distance of the contact point of the connecting rod bearing with the cam lobe to the axis of the mainshaft exceeds the stroke of the piston thereby giving improved leverage and requiring less power to turn the mainshaft as compared to present engines.

Third, because of the higher number of cylinder firings permitted per revolution, this new engine design can use a lower compression ratio. Consequently, low octane fuel may be used efficiently. Moreover, a higher air ratio or leaner mixture can be used thereby resulting in more efficient use of fuel.

Fourth, since the engine is more compact in design, the size and weight of the engine may be very much smaller as compared to the present engines. For xample, for comparable power production, this engine will weigh one-fourth less than the standard present engines.

Fifth, the engine design lends itself to the use of various fuels such as gasoline, diesel fuel and is even adaptable to the use of steam.

Sixth, the engine can be air-cooled, in which case blades may be attached to the mainshaft to propel air through cooling fins or other suitable means.

Seventh, the cam plate design of this new engine permits increased travel for the lifter cam and thereby decreases the amount of spring pressure needed for valve closing and gives infinite variations in valve operation, including duration of lifts, etc.

Moreover, other advantages will become obvious upon detailed description of the invention.

BRIEF DESCRIPTION OF THE DRAWINGS

The description of the engine of this invention is facilitated by reference to the drawings in which:

FIG. 1 represents a diagram used for making calculations pertinent to the diagram of the cam of this invention.

FIG. 1' is an enlarged isolated view of a piston of FIG. 1.

FIG. 2 represents a simplified version of the diagram of FIG. 1.

FIG. 3 is a diagram showing progressive vertical distances effected by progressive arc distances in FIG. 1.

FIG. 4 is an enlarged diagram of a portion of FIG. 3.

FIG. 5 is a diagram showing the application of the vertical distances of FIG. 3 as applied to a sinusoidal curve.

FIG. 7 is a diagram showing how a contact point of a bearing with the cam surface is determined.

FIG. 8 represents a similar diagram method as in FIG. 6 except that this is designed to determine the configuration of the sinusoidal curve of the cam at those points which are in contact with the inner edge of a bearing.

FIG. 9 is a top view of a bearing superimposed on a cam at angles of 40°, 45°and 50°.

FIGS. 10 and 11 are other views similar to FIG. 9 in which the positionsof line AC are at angles of 90° and 135° C. respectively.

FIG. 12 is an enlarged top view of a bearing superimposed on a portion of a cam.

FIG. 13 is an enlarged top view showing the distances that center of a bearing travels at various angles.

FIG. 14 is a trangular representation of lines shown in FIGS. 12 and 13.

FIG. 15 is a planar representation of the distances travelled in a stroke.

FIGS. 16, 17 and 18 are representations of the contact points of a bearing with the cam at the outside, middle and inside of the bearing.

FIG. 19 is a side elevational cross-sectional view of a preferred modification of this engine taken at line 19—19 of FIG. 20.

FIG. 20 is a front elevationsl view, with several broken-away sections of the engine shown in FIG. 18.

FIG. 21 is a front elevational view of the cam lobe and cam drum as attached to the mainshaft.

FIG. 22. is a side elevational view of the cam lobe, cam drum and a portion of the mainshaft which are shown in FIG. 21.

FIG. 23 is a schematic view in which the peripheral view of the cylinders, pistons, connecting rod, bearing and cam lobe has been flattened into a single plane.

FIG. 24 shows valve lifter wheels rolling on circular ridges on the cam plate.

FIGS. 26a through 26i represent cross-sections of the bearing-contact portion of the cam of this invention cut by planes coinciding with the centerline of the mainshaft and extending to the exterior of the cam at angles of 0°, 22.5°, 45°, 67.5° and 90° respectively;

FIGS. 27a through 27i represent cross-sections of a cam cut as in FIGS. 26a through 26i having sinusoidal curves but not the ratio compensating features of the present invention.

FIG. 31 is a top view of apparatus designed to machine cams of this invention.

FIG. 32 is a side elevational view of this same apparatus shown in FIG. 31.

FIG. 33 is a side elevational view of a portion of FIG. 32 showing gear arrangement.

FIG. 34 is a cross-sectional view taken at line 34—34 of FIG. 32.

FIG. 35 is a cross-sectional view of a cam lobe showing an arrangement of cutting tools for cutting both sides of a cam lobe.

Figure 6:
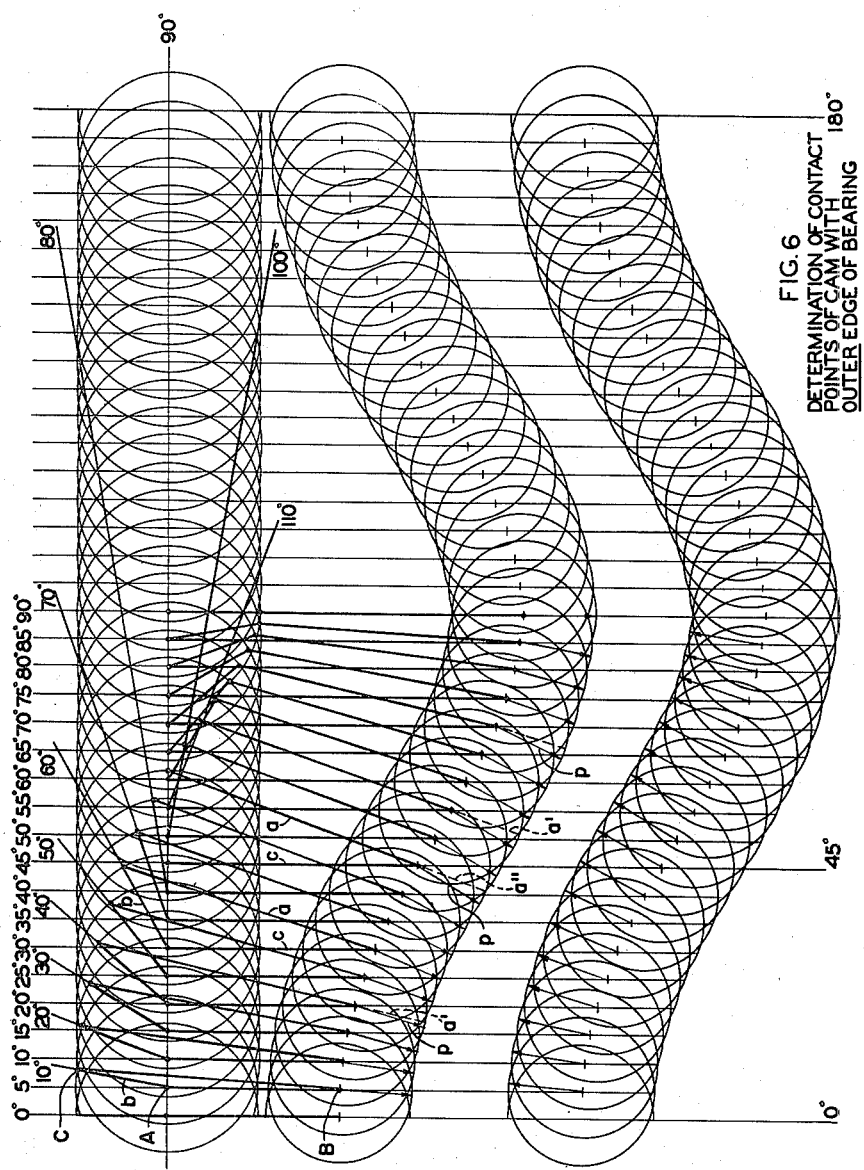
FIG. 6 represents a diagram mwethod of applying progressively the data collected by the diagrams of FIGS. 1–5 to determine the configuration of the sinusoidal curve of a cam of this invention which is in contact with the outer edge of a bearing.

In the engine of this invention, the centerlines of the pistons and the centerlines of the connecting rods between pistons travel in lines parallel to the axis or centerline of the mainshaft. It is important, in order to avoid vector forces that will give a sideward thrust, that the line of contact points of a bearing against the cam embraces the centerline of a pair of pistons and that the direction of force applied by the bearing against the cam preferably substantially coincides with the centerline of said pair of pistons so as to impart "centerline thrust".

Each of the bearings attached to the connecting rods is maintained in a position so that its axial centerline is pointed in such a direction that the imaginary extension of this centerline intersects the axis centerline of the mainshaft at a 90° angle. This positioning of the bearing is effected by having a portion of the connecting rod slide in a groove (not shown) which prevents the connecting rod, as well as the pistons connected thereto, from rotating or revolving on their respective centerlines or axes. This gives the effect of having the bearing rotate on an imaginary axle which extends to and at a 90° angle to the centerline of the mainshaft. Since the bearing travels upward and downward on the rises and valleys of the cam, this imaginary axle slides up and down on the mainshaft centerline to maintain its 90° angle therewith.

Imagine that the bearing travels on a flat cam surface and rotates on its imaginary axle, the contact points of the bearing comprise a straight line parallel to the axis or centerline of the cylindrical bearing. As the bearing thereafter rotates, each point of that straight line travels the same distance for each revolution of the bearing. However, the radius $R'$ from the centerline of the mainshaft to the outermost point on that line or the outer edge of the bearing is greater than the radius $R''$ from the innermost point on that line or the inner edge of the bearing. This difference in radii comprises the width W of the bearing. Consequently, as the bearing is rotated on its imaginary axle, the circumference of the path of the outermost point on the cam surface has a relationship to $2\pi R'$ and the circumference of the path at the innermost point on the cam surface has a relationship to $2\pi R''$. However, as discussed above, the radius of the circumferential path of the innermost point is shorter than the radius of the circmferential path of the outermost point by the width of the bearing, or in other words, $R''=R'-W$. Therefore, the innermost point travels a shorter circmferential distance by the amount of $2\pi R'-2\pi(R'-W)$, or $2\pi R'-2\pi R'+2\pi W$, or $2\pi W$ than the circumferential distance traveled by the corresponding outermost point.

Next imagine that the cam surface instead of being flat is a sinusoidal surface in which the slopes of the indentations of the sinusoidal curves of the innermost and outermost circumferences of the bearing path correspond in slope to that of the sinusoidal curve in the center of the bearing path. In other words, a plane projected from the axis of the mainshaft to any outermost point on the cam will give cross-sections showing the bearing contact area of the cam having the same thickness of cam at the innermost, center and outermost points. The rises and reverse rises will have thicker cam sections than the intermediate sections between rise and reverse rise but the thicknesses at a particular cross-section will be uniform whether the cross-section is at a rise, reverse rise or any intermediate position.

As a bearing travels on such a sinusoidal cam surface, the same principle applies as to the circumferential distances traveled. Thus the path on the cam surface traveled by the innermost edge of the bearing is considerably shorter than the path on the cam surface traveled by the outermost edge of the bearing.

Therefore, since each point on the straight line of contact points described above roates the same distance for each revolution of the cylindrical bearing, the outer edge of the bearing must travel a greater circumferential distance than the innermost edge of the bearing thereby resulting in friction and binding between the bearing and the cam.

In some of the prior art patents cited above, the bearings are designed in conical shape to compensate for these differences in circumferential distances that the outer and inner edges must travel. However this method of compensation produces vector forces giving an undesirable outward thrust to the connecting rods and to the pistons.

At each of the rises and reverse rises of the cam of this invention the points of contact of the bearing with the cam comprise a straight line as described above. Between a rise and a reverse rise there needs to be a compensation for the greater distance that the outermost point of the bearing travels compared to the shorter distance that the innermost point of the bearing travels.

In the cam of this invention, the centerline of the contact path between the bearing and the cam is referred to as the centerline sinusoidal curve. The intersection of this sinusoidal curve with the straight line of contact points of the bearing with the cam at the respective rises and reverse rises is consistent throughout the rotation of the bearing. However, between the rises and reverse rises, there needs to be an adjustment of the line of contact points on the cylindrical surface of the bearing. As the bearing moves away from a rise, there is a gradual variation in the line of contact points to spirals increasing gradually in variance from the straight line of contact so that as the bearing reaches the midpoint between the rise and reverse rise, the points of contact from its widest spiral line deviation on the surface of the cylindrical bearing with the outermost point on this spiral line being either right or left of a straight line on the cylindrical surface passing through the point of contact of the bearing with the center sinusoidal curve and the innermost point of the spiral of contact points is either left or right of said straight line. In other words, the outermost point and the innermost point are on opposite sides of this staight line. The factor determining whether the outermost point is to the right or left of said centerline is whether the bearing is moving up or down the rise, and whether the movement of the cam is clockwise or counterclockwise around the mainshaft.

Then as the bearing moves from this midpoint between the rise and reverse rise, this spiral line of contact points gradually reverses direction until at the time the bearing reaches the reverse rise, the contact points have reverted to a straight line.

As the bearing moves further going up from the reverse rise to the rise, another spiral contact line is formed with the positioning of the points being the reverse of where they were on the way down from the rise to the reverse rise. Again as the bearing passes the midpoint to the rise, the direction of contact points reverses so that gradually the spiral reverts to a straight line of contact points at the top of the rise. This variation of contact points from a straight line to a spiral and then back to a straight line compensates for the greater distance traveled by outermost points on the bearing as compared to innermost points on the bearing. This action is defined herein as "ratio compensation".

It is possible to calculate the cam surface design which will effect "ratio compensation" contact with the respective bearings. This can be done by translation of circular or crankshaft motion to straight line motion using distance or length D equivalent to the stroke or distance of travel of a piston. This method of calculation may be used for the outermost, center and innermost of the contact points on a bearing or any intermediate contact point. Generally the determination of the sinusoidal curves for the outermost and innermost contact points of a bearing with the cam are sufficient and intermediate contact points comprise a gradual transition from the outermost to the innermost points. The sinusoidal curve developed for the outermost contact points have a lesser slope between rise and reverse rise as compared to the sinusoidal curve for the innermost contact points. This difference permits the variations in contact as the innermost and outermost points as compared to each other and to the center points which effects ratio compensation so that between rises and reverse rises the contact points resemble a spiral on the cylindrical surface of the bearing but at the respective rises and reverse rises the contact points form a straight line on the cylindrical bearing parallel to the axis of the bearing.

BEST MODE FOR CARRYING OUT THE INVENTION

In FIG. 1 the stroke of the piston is represented as distance "D" which is also the distance from point 0° to point 180° on the circle. D also represents the diameter of the circle. FIG. 1' is an enlarged version of FIG. 1 but isolated on the lines for C having traveled 10° on the circle. FIG. 2 is also isolated on the 10° arc and shows the distance x that point B has traveled on line F. Point C is identified as the point of contact of line b with the circle and point B the point of contact of piston rod R with the circle at zero position. As the wheel or circle is rotated on its center A, the point of contact C moves in a circle path and point B moves downward along the path of line F until when point C has traveled 180° in its circular path, point B has traveled the distance D on its straight line path F. Points B' and B'' show the intermediate positions of B at 90° and 135° respectively.

In having a bearing travel from one rise to an adjacent reverse side (such as from 0° to 90°), the piston travels a cycle or the stroke distance. Then with the bearing traveling to the next rise the piston has reversed to its original position and completed two cycles for one-half revolution of the cam. Therefore there are two cycles of piston movement for each one-half revolution of the cam and the piston travels 10° of its cycle for each 5° of cam revolution. In other words, a bearing covers 5° of the cam for each 10° by the piston. Therefore the distance x which is the vertical distance traveled in 10° of arc of travel will also be the vertical distance a bearing will move in contact with the cam surface through 5° of cam revolution. Likewise, in 20° and 30° of point C movement, the vertical distance moved by the bearing in contact with the cam will be y and z, respectively.

For each 10° arc of travel (or other convenient arc) of the piston through its cycle, the distance for each position of C to the center A of the circle is the radius of the circle or D/2 and the distance from each position of C to the corresponding point of B on line F in each case is D or the stroke distance. The 10° and 20° positions are not shown according to scale but are exaggerated for clarity.

In FIG. 2, the 10° arc position is shown with the oblique triangle having D as its longest side, D/2 as its shortest side and the third side equal to D/2 plus the distance traveled by point B on line F of FIG. 1. The obtuse angle in this triangle is 180° − 10° or 170°. Knowing this angle and the lengths of two sides of the triangle, it is possible to calculate the length of the third side. The length of this third side of the triangle differs from D/2 by the distance that B has traveled on line F. This also corresponds to the vertical distance x that C has traveled in moving from 0° to 10° on its circular path.

Likewise when C has moved in its circular path 20° and 30° respectively, the total vertical distances moved by C will be y and z, respectively. Correspondingly, B will have moved these same vertical distances respectively along the path of line F. FIG. 3 shows in exaggerated scale how the point of contact point B will travel vertically on a cam surface traveling 10°, 20° and 30°, respectively.

The distances x, y, z, etc. shown in FIGS. 3 and 4 also represent the vertical distance that the point C has moved from its original zero position for each of the specific angles or arcs of movement. These also represent the positions of the center of a bearing as it moves the respective arc distances on the sinusoidal cam.

FIG. 5 represents a sinusoidal curve with HR representing the high rise positions and DRR representing the depth of the reverse rise positions. This is also a planar representation of a sinusoidal curve through 180°. Increments of 5° each are shown through the first 45°. With 5° of the cam corresponding to 10° of a piston cycle, the corresponding values of x, y, z, etc. may be plotted to give a sinusoidal curve which corresponds to the sinusoidal path of the center of a bearing traveling on the sinusoidal surface of a cam of this invention.

At the top of FIG. 6 a series of circles are drawn with the centers of each circle positioned on a horizontal line. The length of this horizontal line represents 180° of travel on the cam and also represents one-half the circumferential distance, in this case the outer circle of the cam or the contact points of the outer edge of a bearing with the upper cam surface. The positions of these circles are moved progressively 5° to the right for each 10° of movement of the piston which corresponds to 5° of movement on the cam. For each 10° of piston movement through its cycle, a diagram is drawn in accordance with that illustrated in FIGS. 1 and 2 to show the triangles formed by points or angles 1, 2 and 3.

At 0° for both the piston cycle and the cam revolution, the center of the circle for the piston is on a vertical line extending downward from the 0° point and for convenience, the center of the circle representing the center (or axis of the bearing at the outer end or the end which is in contact with the outer edge of the cam) is positioned on this vertical line at a distance corresponding to line c which is the distance between points A and B. As the circles are moved progressively to the right on the horizontal line each successive 5° and the successive arcs for piston movement determined on each respective circle, the points C are determined and the point B (center of bearing) is moved down on the corresponding vertical line a distance equal to the vertical movement of C. In this manner a series of circles are drawn on the horizontal line and the positions of bearing centers are determined by drawing the respective triangles. A line drawn through these bearing center points form a sinusoidal curve and a series of circles are drawn on such sinusoidal curve, each circle having a radius corresponding to the radius of the cylindrical bearing.

The contact point of each circle (in this case the outer edge of the bearing) with the cam is determined by drawing a triangle between three successive center points as shown in the enlarge exaggerated version shown in FIG. 7 where three successive center points are shown as B, B' and B''. The largest side of this triangle is the line between the 1st and 3rd points (B and B'') and the two shorter sides are between the 1st and 2nd points (B and B') and between the 2nd and 3rd points (B' and B''). A line p is drawn from the 2nd point (B'), which is the center for the middle circle of the three, perpendicular to the longest side of the triangle (from B to B'') and extended to the circle. The circle shown in FIG. 7 is that which has B' as its center. The point of intersection of this line p with the circle is the point of contact of the bearing with the sinusoidal cam surface.

This procedure is repeated progressively for each successive combination of three circles to determine the tangent or point of contact of the successive circles (or positions of bearing) with the cam surface. These points of contact determine the contour of the cam surface against which the bearing will come in contact.

In the formation of the triangles described above, for determination of the centers of this second or lower series of circles (for positioning a bearing) the side "a" runs from the end of a piston arc to the center of a corresponding circle in this second series of circles. An arc of travel on the cam circumference is indicated by the 5°, 10°, 15°, etc. degree markings at the respective vertical lines and the ends of arcs traveled in a piston cycle indicated by lines marked 10°, 20°, 30°, etc. extending from the appropriate point on the corresponding circle. These respective points 10°, 20°, 30°, etc. represent point C in the respective triangles of FIGS. 1 and 2. The line a drawn form C to B is extended as shown by dotted line a'.

For the circles having piston arcs of 0° and 90°, there is no line a' since it coincides with the vertical centerlines. However as the piston arcs increase from 10° through 90°, the space between a dotted line a' and the closest line used to determine the cam contact point increases progressively until a maximum space is reached at 45° where a" is substituted for a'. This maximum space means that the contact point of the outer circle of the bearing is at a maximum variant from where it is at 0°. Then in progressing from piston cycle arcs of 45° to 90°, the space defined between a' and the contact-determining line decreases gradually to where at 90° the dotted line a' coincides with the vertical centerline.

Although these a' lines are not projected in each case through completion of the piston cycle, the space between the a' line and the contact-determining line p increases from 90° to maximum at 135° and then decreases gradually from a maximum at 135'' to zero space at 180''. This gradual increase in these spaces and then gradual decrease in these spaces represent the "ratio compensation" mentioned above.

Below the above-described second series of circles, there is shown in FIG. 6 a third series of circles which are similarly projected from a horizontal row of circles (not shown) which are positioned further below the third series of circles and are projections from the opposite piston joined by a connecting rod and acting in unison with the piston for which projections have been described above. The contact points of the second series of circles with the cam surface determine the contour of the upper surface of the cam at its outer edge and the contact points of the third series of circles with the cam surface determine the contour of the under surface of the cam at its outer edge.

It will be noted that the cam is thickest at the 0°, 90° and 180° points of the cam and thinnest at the 45° and 135° points. It will also be noted that the contact points for the circles (or bearing positions) at 45° on the cam are on opposite sides of the 45° vertical centerline. Since the space between two bearings on the same connecting rod remains constant, this means that the thickness of the cam at 45°, 135°, 215° and 315° positions must be correspondingly thinner than the cam at its 0°, 90°, 180° and 270° positions.

FIG. 8 shows similar series of circles developed as in FIG. 6 except that these are for the inner edges of the respective bearings. The horizontal line of centers for the first or top series of circles is scaled for 180° of the circular configuration of the cam taken at the contact points of the inner edge of the bearing with the cam surface. The second or middle series of circles is developed as in FIG. 6 to determine the center points of the upper bearing at various progressive points in the bearing's travel at 5° increments over the cam with the contact points of the inner edge of this bearing on the cam surface determined in the manner described for FIG. 6.

Likewise, the third series of circles and the contact points of the lower bearing on the same connecting rod as for the said upper bearing are determined from a series of horizontally positioned circles (not shown) but also developed in the manner described as for FIG. 6 and the cam surface contact points developed as for FIG. 6.

It will be noted that the slopes of the sinusoidal curves of FIG. 8 are much steeper than for the corresponding curves of FIG. 6. This means that the curves from the rises to the reverse rises and vice versa are much steeper in this case.

At the 45° point on the cam, the triangle is shown for sides a, b and c with the extension of line a shown as dotted line a''. The line from the center of the corresponding circle in the second or middle series of circles to the contact point of that circle (or inner bearing edge) with the cam surface is also shown. It will be noted that the space (or angle) between a'' and the line determining this contact point is much greater than for the 45° position in FIG. 6.

Although the lines for the respective circles are not drawn in FIG. 8, they may be drawn to show progressive decrease in the space between the extension lines a (not shown) and the contact-determining lines as the circles move away from the maximum space or angle at the 45° position until they reach the minimum of 0 at the 0° and 90° positions. The maximums are again reached at the 135°, 225° and 315° positions and the minimums (or 0) again reached at 180°, 270° and 360° positions.

As described above, this design of the surfaces of the cam of this invention permit full contact as each bearing travels on its circumferential path on the cam and by the spiraling contact described above and its ratio compensation for the inner and outer areas of the bearing as effected by the varying slopes of the sinusoidal surfaces of the cam, the bearings effect rotation of the cam and the mainshaft without the friction that accompanies the use of a sinusoidal cam that has uniform thicknesses in the inner and outer portions of the cam.

In accordance with FIG. 1, for an arc of 45° angle A is equal to 180°−45° or 135°. For a stroke of 1.900 inches, line a of FIG. A has a length of 1.900″ and b=D/2 or 0.950. Using the equation Sine B/b=Sine A/a or Sine B/0.950=Sine 135°/1.9; Sine B=Sine 135°×2; angle B is determined, and angle C is determined as equal to 180 -the sum of angles A and B. Distance C is determined by the formula c/a=sine C/sine A or c/1.9=sine C/sine 135°. The length of travel of the piston from the top dead center point (T.D.C.) to the 45° angle is equal to the difference between c and the radius or c-0.950.

As discussed above with regard to FIG. 1, the maximum piston travel distance is identified as D which, in this case, is also the diameter of the circle traveled by point C. The contact point of the bearing with the cam face may be calculated for the various arcs of travel of point C as described below in connection with FIGS. 12-18.

In FIG. 1, the 0° point is the top dead center point (T.D.C.) and the 180° point is the bottom dead center point (B.D.C.) of the piston stroke or the connection point of the connecting rod with the bearing center. The intermediate positions of this connecting point or bearing center are determined as described for FIGS. 6 and 8. With the bearing center remaining on the centerline of the piston and of the connecting rod, the bearing rises and falls with the upward and downward movement of the piston and connecting rod. This upward and downward movement of the bearing causes pressure on the cam surface resulting in rotation of the cam.

To determine the actual contact points of the bearing with the cam surface a number of calculations may be made as described for the determination of line p in FIGS. 6 and 7. This is also illustrated below in FIGS. 13, 14, 16, 17 and 18.

FIGS. 9, 10 and 11 illustrate the determination of the location for points A, B and C and the resultant triangles for angles 45°, 90° and 135°. FIG. 9 shows by dotted lines variations in the respective triangles for 5° less and greater than the 45°, namely 40° and 50°, as developed more fully below in connection with FIGS. 12, 13 and 14.

In FIG. 12, a bearing L is shown superimposed on cam J. While the bearing actually remains in the same position except to move up and down vertically, and the cam rotates below or above a particular bearing, this is a matter of relativity and the bearing is depicted here at a 45° angle on the cam. Radial dotted lines are shown for 40°, 45° and 50°. The outer edge of the bearing is identified as 0, the midpoint of the bearing cylindrical surface as M and the inner edge of the bearing as I. The intercept points of the radial lines for 40°, 45° and 50° are identified as O', O″ and O‴ respectively. The vertical distance between O' and O″ is identified as x' and that between O″ and O‴ as x″. The x' and x″ distances also represent distances on the vertical line between 0° and 180° of FIG. 1 that the center of the bearing will travel when the piston and connecting rod connecting point to the bearing has traveled from 40° to 45° and 45° to 50° of the stroke distance.

Since the lengths of these 5° arcs are relatively short, they are approximately equal to a straight line between the respective points. The arc distances may be calculated as 5/360 or 1/72 of the appropriate circumference which is $2\pi R$ where R is the radius of the respective circles for the line of contact of the outer edge, middle and inner edge respectively of the bearing with the cam surface. While the cam surface is actually sinusoidal, the circle referred to is considered as one produced by having the contact point of the bearing rotate on a flat surface with the center of rotation being the axis of the cam or the cam shaft. It may also be considered as the outer surface of a cylinder on which the contact points of the particular part of the bearing with the cam surface will be included.

FIG. 13 shows the various distances that the center of a bearing travels (on the vertical 45° line) from 0° to the full stroke at 180° including the various intermediate distances at 40°, 45° and 50°. The vertical distances between the 40° and 45° points and between the 45° and 50° points are identified as x' and x″ as also described above. The overall vertical distance from 0° to 40° is identified as y'; from 0° to 45° as y″; and from 0° to 50° as y‴. A triangle is defined in the center of FIG. 13 by the horizontal 40° line running from the 40° vertical line to the 50° vertical line; a vertical section on the 50° vertical line running from the 40° horizontal line to the 50° horizontal line; and the hypotenus connects the two unattached ends of the said horizontal and vertical sides. A line is drawn perpendicular to this hypotenus at its intersection with the vertical 45° line. This perpendicular line forms an angle P with the said vertical 45° line and this angle corresponds to the angle P formed between the horizontal 40° line and the said hypotenus. This same triangle is shown in enlarged form in FIG. 14.

In FIG. 14 the length of line 0' and 0″ is the 5° arc length of FIGS. 12 and 13 and the length of line 0″ -0‴ is also a 5° arc length so that triangle side 0'-0‴ is twice the 5° arc length. The vertical side of the triangle is equal to x' plus x″ . Therefore the value of angle P is determined from the equation:

Tangent of P (x'+x″ )/(twice the 5° arc length)

Thus, as illustrated in FIGS. 15–18, where the stroke or a value is 1.900 inches, the radius or b value is 0.950, the bearing has a width of 0.5 inch and the radius from the center of the cam to the outer edge of the bearing is 3.5 inches, the respective 5° arc lengths are calculated to be 0.1525 at the contact line for the outer edge of the bearing, 0.1416 at the contact line for the middle of the bearing and 0.1307 at the contact line for the inner edge of the bearing. The angle P is 13° 4' 16″ for the outside, 14° 5' 2″ for the middle and 15° 16' 26' for the inside, with x'+x″ value being 0.71 inch in each case.

This determination of angle P makes it possible to determine also the contact points of the bearing with the cam surface. Thus in FIGS. 16, 17 and 18, the points of contact are identified as X, Y and Z respectively for the outside edge of the bearing, the middle of the bearing and the inner edge of the bearing. Using the respective different circumferences for these outside, middle and inner circles, it is possible as described above to determine the value of angle P in each case, and then the distances for X, Y and Z from the 45° line as shown in FIGS. 16, 17 and 18. Thus, as shown in FIGS. 16, 17 and 18, the contact points of the bearing are 0.170 inch from the 45° line for X (the outer edge of the bearing), inch for Y (the middle of the bearing) and 0.198 inch for Z (the inner edge of the bearing. These differences or variances in the distance of these various contact points from the 45° line confirm the fact the contact points on the bearing surface form a spiral line at the 45° point of the cam as compared to the straight line contact effected at the 0°, 90°, 180°, 270° and 360° points of the cam. Between the maximum variance at the 45°, 135°, 225° and 315° points and the adjacent straight line of contact points there is a gradual change from one to the other and the exact contact points for various angles of the cam may be calculated as described above.

The ratio 0.198/0.170 or 1.1655/1 is the compensation that must be accommodated between the outer and inner edges of the bearing because of the differences in respective circle circumferences that the outer and inner edges must travel in its travel over the sinusoidal cam (or the sinusoidal cam under or over the bearing). This ratio compensation is effected by the type of cam surface described herein. This same ratio may be calculated from the respective circumferences, namely 21.966/18.824 or 1.1655/1.

In order to design an appropriate cam lobe it is necessary to have certain information or dimensions predetermined, such as the diameter of the bearings to be used on the cam lobe, the stroke of the piston (or the distance through which the bearings will be pushed by the piston) and possibly the thickness of the cam lobe at the rise or reverse rise of the lobe. The thickness of the cam lobe at this point should be limited substantially to the distance between the closest points of the two bearings that are in contact with the cam lobe and at opposite sides of the cam lobe, with a minimum amount allowed for clearance.

Obviously the farther the contact points are from the axis of the mainshaft, the greater will be the leverage for turning the mainshaft. Since the cam lobe needs to be only wide enough to permit contact of the bearings with it, the cam drum may be big enough to occupy most of the space between the mainshaft and the bearing contact area on the cam lobe.

A primary requirement is that there is always one bearing of a pair in contact with one of the cam lobe surfaces. The other bearing of the pair may be in contact with the opposite cam lobe surface but preferably may have a clearance of about 0.002 inch or more. When there is a variation from the ideal design described above there may be considerably less thickness in the cam lobe between rise and reverse rise, in which case there will be more clearance of the second bearing during its non-contacting movement When the two opposing bearings reach a rise or a reverse rise, there will be a changeover in the contact of the bearings. For example, the bearing in contact with the lobe surface as it moves down from the top of the rise to the dip or reverse rise after passing the thickest part of the lobe becomes the bearing out of contact with the lobe surface, depending on the clearance, and the other bearing becomes the one in contact with the lobe surface until the next rise is reached. While it is preferred that there is at least about b 0.002 inch clearance for the non-contacting bearing, it is possible with an ideally designed lobe that both bearings are in contact with the adjacent lobe surfaces allowing for lubricant and operating engine heat expansion.

As indicated above, the engine of this invention may be designed for 4-cycle operation with 2, 4, 6, 8, 10, 12, 16 or more cylinders to give smoother and more efficient operation than with conventional engines. In 4-cycle operation the firing exhaust, intake and compression are performed on separate strokes. In 2-cycle operation, the firing and exhaust are preformed on one stroke, and the intake and compression are preformed with a second stroke. With 2-cycle operation, the engine of this invention may be designed with 1, 2, 4 or more cylinders, that is, with two pairs of opposing cylinders and pistons. Such small engines may be used on motorcycles, bikes, etc.

It is also possible to adapt the engine of this invention with certain modifications for use as a compressor. Thus if an external power source is used to drive the mainshaft, air or other gas may be taken into the cylinders, compressed and exhausted under pressure. If desired, two engines of this type may be joined on the same mainshaft with one engine providing the power to drive the mainshaft and the other to perform as a compressor. Moreover, an engine of this invention may be used to drive the shaft of a generator to provide electrical current.

In using one engine of this type as a compressor and another of these engines to deliver power to the compressor, the two mainshafts of these engines would be coupled with a clutch or another type of power source may be used to drive the mainshaft of the compressor engine. Poppet valves, spring operated or otherwise, may be used to delivery compressed air to the receiving line or reservoir.

In FIG. 19, mainshaft 1 has attached to it cam drum 2 and to this cam drum 2 there is attached the cam lobe 3 with the cam lobe having a high rise shown as 3' and a low section or opposite high rise shown as 3''. Cam lobe 3 has the sinusoidal surfaces described above. Pistons PA and PA' in cylinders A and A', respectively, are connected by connecting rod 4 and 5 which has attached bearing 6 which rotates on axle 7 and is made freely rotatable by ball bearings 8. Cam drum 2 has tapered circular ridges 9 and 9' on both of its plates 10 and 10' with periodic rises in these ridges. Grooved wheels 11 and 11' are part of the valve lifter and these ride on the ridges and are connected to push rods 12 and 12''. Push rods 12 and 12' press against and actuate rocker arms 13 and 13'. The rocker arms are supported by rods 14 and 14' which are screwed into the cylinder head 15. When a rise in ridge 9 (or 9') hits and pushes wheel 11 (or 11') outward, this movement also moves push rod 12 (or 12') outward against rocker arm 13 (or 13'). Outward movement of rocker arm (or 13') pushes its opposite arm 16 (or 16') inward thereby opening valve 17 (or 17') to allow passage through the intake valve opening.

Ridges 9 have the rises therein located in a position so that the opening movement of valve 17 is activated at the appropriate time for feeding fuel from opening 18 through the valve opening when intake valve 17 is in the opened position. The rise 9 is of sufficient length to hold the valve 17 in open position for the appropriate length of time in accordance with the operating cycle of the corresponding piston and cylinder. When the rise is terminated the valve is returned to its closed position by spring 19.

Ridges 9' have the rise therein positioned so that the opening movement of valve 17' is actuated at the appropriate time for exhuasting gases from the cylinder through exhaust opening 18'. Again the length of the rise in ridge 9' is sufficient to keep the exhaust valve open for the appropriate time. When the rise is terminated the valve is returned to its closed position by spring 19'.

The engine block is preferably assembled from three separate castings 15, 15' and 15" and is extended into and supported by mounts 20. Cylinder blocks 31 and heads 15 may be individually fastened or bolted onto the engine block.

FIG. 20 shows rocker cover 21 broken away and sections below shown for various inner level operations involving cylinders D, E, F and G. Cylinders A, B, C and H are hidden by the rocker cover but their relative positions are shown by dotted circles. Mainshaft 1 is shown in cross-section. The broken section of the rocker cover above cylinder D shows cam lobe 3, cylinder head 15, cam drum 2, ridges 9 and 9', intake wheel 11, exhaust lifter wheel 11', connecting rod 5 and roller bearing 6. Piston PE is shown in cylinder E and the exhaust push rod 12' and intake push rod 12 operating therewith.

The section showing the positioning of cylinder F has the rocker arms removed and shows sparkplug 22, intake valve 17, exhaust valve 17', intake port, and exhaust port 18'. With cylinder G there are shown rocker arm shafts 14 and 14' and the forward portions of rocker arms 16 and 16'.

FIGS. 21 and 22 show top and side elevational views respectively of cam drum 2 and cam lobe 3 with ridges 9 in the top and bottom surfaces of the cam plate and the high rise 3' and reverse rise 3" of cam lobe 3.

In the cross-sectional view shown of a portion of cam drum 2, a rise in ridge 9 is shown to push lifter wheel 11 and push rod 12 upward thereby effecting opening of the intake valve (not shown). At this position ridge 9 is at its normal level so that lifter wheel 11' and push rod 12' have not activated the corresponding valve so that the exhaust valve is in a closed position.

The schematic layout of FIG. 23 shows the relative positions of the various pistons at a particular instant. In this arragement pistons A and E are at the top or crest of cam lobe rise 3' and pistions C' and G' are at the top or crest of reverse cam lobe rise 3". Each of these pistons is in a position for firing and as movement carries the bearings 6 off dead center of the cam lobe rises, the movement of the pistons, the connecting rods and the attached bearings will exert force against the cam lobe and thereby cause rotation of the mainshaft.

It will be noted that two cylinders are firing simultaneously, namely A and G'. At the same instant, cylinders B and H' are halfway through the firing cycle. Cylinders C and A' have completed their firing cycles and are ready to start their exhaust cycle, and cylinders E and C' have finished their exhaust cycle and are ready to start the intake cycle, cylinders G and E' have finished their intake cycle and are ready to start the compression cycle. Cylinders H and B' are halfway through their compression cycles.

Figure 25A:
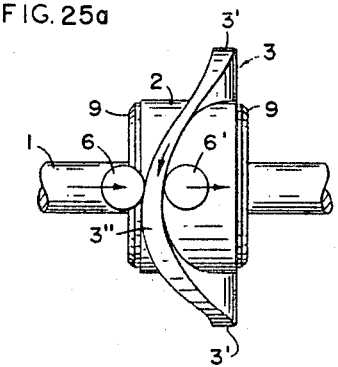
FIGS. 25a, 25b, 25c, 25d, 25e and 25f show side elevational views of the cam lobe and the positioning of the same pair of connecting rod bearings as they travel from a position adjacent to one high rise of the cam lobe in FIG. 25a to a low position in FIG. 25c and then adjacent to the opposite high rise as shown in FIG. 25f, during the course of half of a revolution of the mainshaft.
Figure 25B:
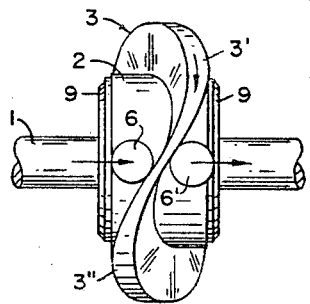
Figure 25C:
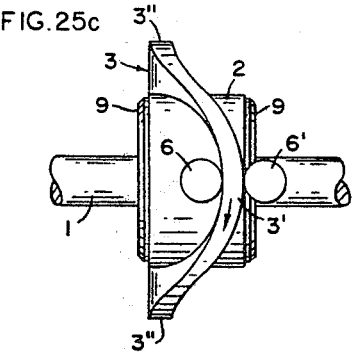
Figure 25D:
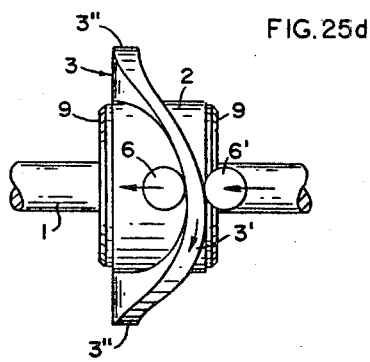
Figure 25E:
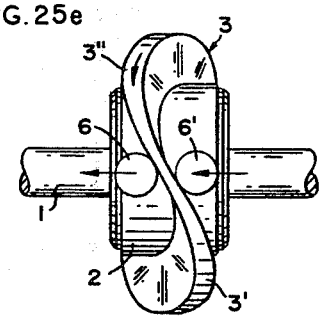
Figure 25F:
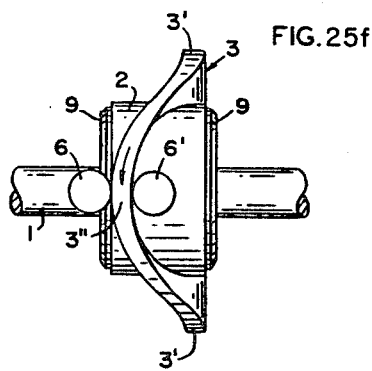

FIG. 25a shows the bearing 6 for piston PA positioned at the top of cam lobe rise 3" just off dead center and ready to start downward thereby exerting force on the cam lobe which will cause mainshaft 1 to rotate. Bearing 6' is under the cam lobe and has just completed its firing cycle travel for piston PA' and is starting its exhaust cycle. FIG. 25b shows bearing 6 and bearing 6' halfway down their paths with the cam lobe and mainshaft rotated part way. FIG. 25c shows the cam lobe and mainshaft rotated still farther and bearing 6 in its position at the end of the firing cycle for piston PA and bearing 6' is in its final position for exhaust of cylinder A'. FIG. 25c shows bearing 6 starting its exhaust movement upward on the cam lobe and bearing 6' is also starting upward in its intake movement for cylinder A'. FIG. 25e shows bearing 6 and bearing 6' halfway in their upward movement for exhausting cylinder A and intake for cylinder A' respectively. FIG. 25f shows bearing 6 at the top of the opposite rise 3" for completing the exhaust movement of cylinder A and bearing 6' at the top of its intake cycle for completing the intake movement of cylinder A'. FIGS. 25a through FIG. 25f show the movement of bearings 6 and 6' for one-half revolution of the mainshaft. In subsequent movements (not shown), bearing 6 goes through positions for intake and compression of cylinder A taking bearing 6 back to the position of 25a for completion of the cycle and one complete revolution of the mainshaft. In subsequent movements (not shown) of bearing 6", it goes through the compression and firing cycles of cylinder A' taking it also back to the position shown in FIG. 25a.

While the drawings described above are directed to 8 pairs or 16 individual pistons and cylinders, the engine of this invention may also be operated with lower or higher numbers of pistons and cylinders. For example, four or six pairs may be used as well as ten or twelve pairs or even higher with appropriate arrangement and timing to effect smooth and efficient operation.

FIGS. 26a through 26i represent cross-sections of the bearing-contact areas of the cam of this invention taken by planes each coinciding with the centerline of the mainshaft and taken at angles of 0°, 22.5°, 45°, 67.5°, 90°, 112.5°, 135°, 157.5° and 180° respectively. As shown in the respective trapezoids of FIGS. 26a through FIG. 26e, the cam portions gradually decrease in thickness from 0° to 45° and then increase gradually from 45° to 90° where the thickness reaches the same as for 0°. Similar decrease to 135° and then increase to 180° are shown in FIGS. 8f to 26i. Moreover, as the transition goes from 0° to 45°, the right side of the respective trapezoids, which right sides are represented by dotted lines since this side is the only side not an outer configuration of the cam lobe but actually extends into the cam. The end points of this dotted line are on the contact line of the inner edges of the bearings in contact with the cam lobe. These decrease in size at a greater rate than the left sides of the respective trapezoids, which left sides represent the outer circumference of the cam lobe and the extremities of the left side line represent the line contacted by the outer edge of the bearings. The dimensions given on FIGS. 26a through 26i are actually dimensions for a cam lobe having a radius of 3.246 inches from the centerline of the bearing path (which also corresponds to the centerline of the piston or connecting rod) to the axis of the cam (as well as axis of the mainshaft). The centerline circumference is 20.985" and the outer and inner circumferences are 21.966" and 18.824" respectively. The bearing used has a 1 inch diameter and 0.5 inch width.

The rectangular configurations of FIGS. 26a, 26e and 26i represent the thickness of the contact bearing portions of the cam taken at 0°, 90°, 270° and 360° or in other words, at the respective rises and reverse rises of the cam of this invention. The respective intermediate trapezoidal configurations of FIGS. 26b, 26c, 26d, 26f, 26g and 26h result from the steeper slope of the sinusoidal curve in conact with the inner edge of a bearing as compared to the lesser slope of the sinusoidal curve in contact with the outer edge of the bearing. The dimensions of the various lines shown in FIGS. 26a through 26i are calculated and the accuracy of these measurements is confirmed by cutting the cam in the planes indicated and measuring the respective dimensions.

FIGS. 27a through 27i show cross-sections at the areas corresponding to those of FIGS. 8a through 8i taken on a cam having sinusoidal surfaces of the type known in the prior art which do not have the ratio compensation feature of the present invention. In this series all of the cross-sections created by the respective planes used as FIGS. 8 through 8i at angles of 0°, 22.5°, 45°, etc. are rectangles with the right sides in each case having the same dimension as the left side. While the thickness of these sections decrease from 0° to a minimum at 45° and increase from the minimum at 45° to a maximum at 90°, the dimensions for the two sides are the same in the cross-section for a particular angle. These shapes and dimensions are consistent with the fact that the slopes of the sinusoidal surfaces are the same at the contact points of these surfaces with the inner and outer edges of the bearings.

Figure 28:
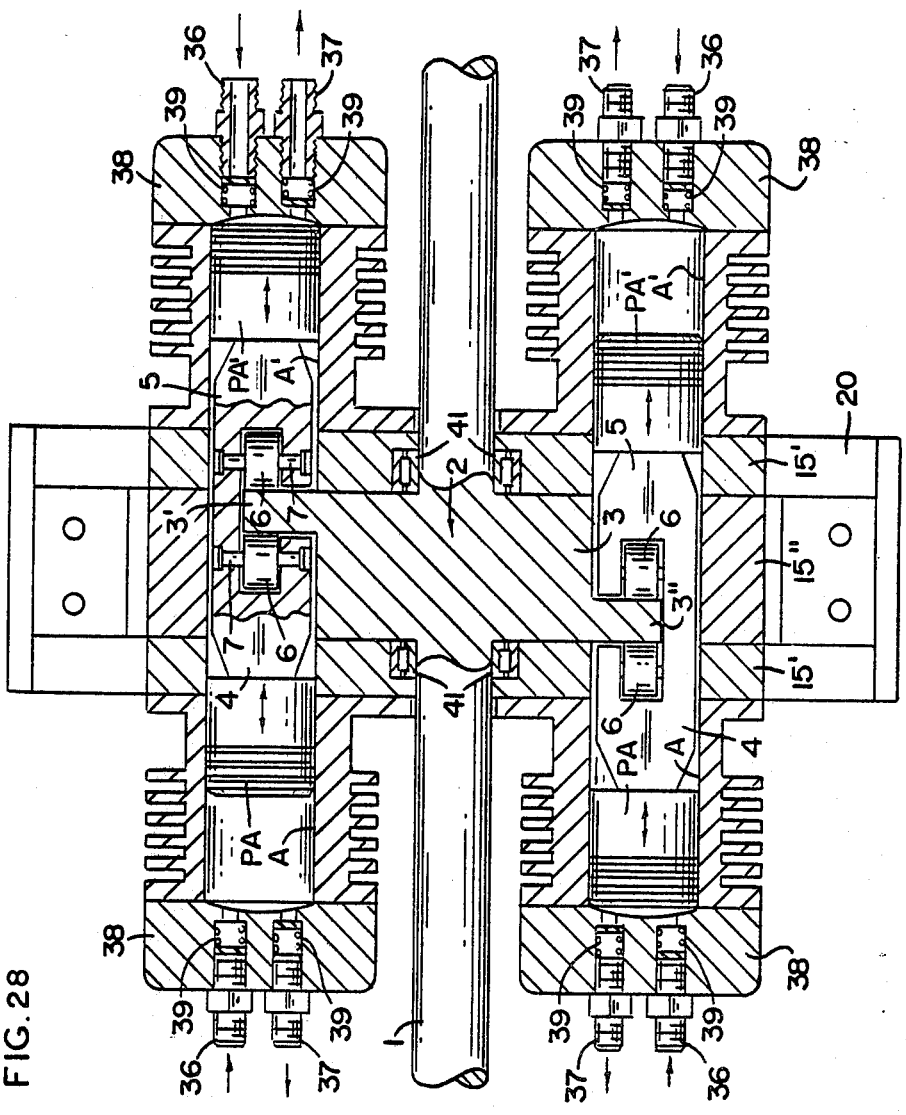
FIG. 28 is a side elevational cross-sectional view of a modification adapted for use as a compressor in which modification the sinusoidal surfaces are outer surfaces of the cam lobe.

FIG. 28 shows a modification in which the engine of this invention has been adapted to serve as a compressor. The various elements are as described above except that cylinder head 15 and various fittings and attachments are replaced by clylinder head 38 which has threaded openings into which intake valve 36 and outlet valve 37 are fitted so as to connect with the interior of cylinder A or A'. Mainshaft 1 is driven as described below, while rotatably supported on bearings 41, whereupon cam lobe 2 is rotated and thereby the sinusoidal surfaces press against the bearings 6. This produces a forward and backward motion of connecting rods 4 and 5 and therewith movement of pistons PA and PA'. Such movement of the pistons draws air or other gas into inlet valves 36 and then upon reversal of direction of the piston intake valve 36 closes and air under compression is forced out of outlet valve 37. Springs 39 serve to keep valves 36 and 37 closed until sufficient differential pressure is applied to open the respective valves.

In operating this engine as a compressor, either some or all of the cylinders may be equipped or designed as shown in FIG. 28. If all of the cylinders are so operated, then an external or separate driving force may be used to rotate the mainshaft 1. In such case another engine such as shown in the earlier figures may be used to drive the mainshaft or another type of internal combustion engine, electric motor, etc. may be used for this purpose.

Another alternative is to have some of the cylinders equipped to operate as a power engine as described above and the remaining cylinders equipped and operated to serve as a compressor. In such case, the two pistons attached to a particular piston rod can both serve the same function, namely either to supply driving force to the mainshaft or to serve as a compressor, or one can serve to deliver driving force while the outer functions as a compressor. In either case, the pistons serving one function are staggered with those serving the other function so as to supply an even, uniform compressive force.

Figure 29:
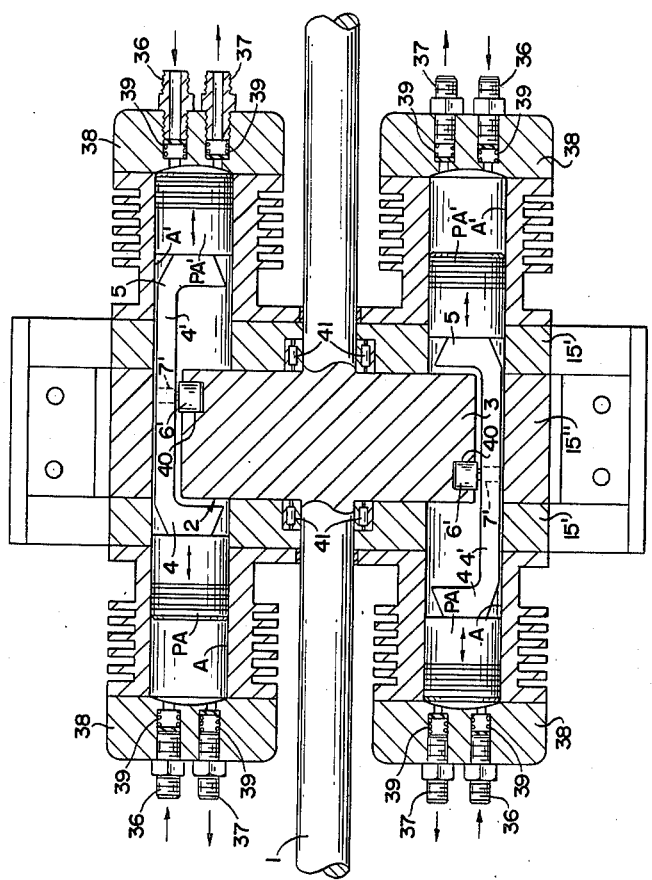
FIG. 29 is a side elevational cross-sectional view of a modification adapted for use as a compressor in which modification the sinusoidal surfaces are the sides of a sinusoidal groove cut in the annular surface of the cam lobe.
Figure 30:
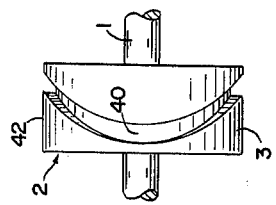
FIG. 30 is a side elevational view of a cam lobe showing a sinusoidal groove in its annular surface.

FIG. 29 shows a design in which the sinusoidal surfaces are the side surfaces of a groove 40 cut into the annular surface of the cam lobe as shown in FIG. 30. In such cases the surfaces against which the bearing is in contact is shaped similarly to those described above so that there is ratio compensation for the travel paths of the outer and inner edges of the bearings.

In FIG. 29 there is only one bearing 6 attached to each piston rod in contrast to the two shown in FIGS. 19 and 28. Moreover, the width of the groove is at least substantially equal to the diameter of this bearing with a small tolerance to allow rotation of the bearing while in contact with only one of the sinusoidal surfaces during a particular period. Connecting rod in FIG. 29 has a narrow midsection 4' to accommodate cam drum 2 extending thereinto to a position where the centerline of the pistons PA and PA' coincides with the midpoint of bearing 6. The axis of the bearing is at a 90° angle with the centerline of the piston. This arrangement provides "centerline thrust" between the bearing and the cam surface thereby avoiding any sideward vector thrust and any tendency to give a sideward thrust to the pistons.

The operation of the engine with the groove shown in FIGS. 29 and 30, either to deliver power or to produce gas compression, is substantially the same as described above with respect to the design in which the sinusoidal surfaces are outer surfaces of the cam lobe. In both cases, however, the cam lobe surfaces with which the bearing or bearings are in contact are at a substantial distance from the linear axis of the mainshaft as compared with the distance from this linear axis to the annular surface of the mainshaft. The ratio of these distances is at least 2:1, and preferably at least 3:1.

A particular advantage of the engine of this invention is the simplicity of engine manufacture and assembly. For example, the engine block may be assembled from three separate castings 15", 15' and 15" bolted together and the individual cylinder heads 15 may be bolted onto the engine block. This bolting arrangement of the engine block and the cylinder heads facilitates and makes less expensive the manufacture, assembly and repair of the engine or any part of it.

Moreover, cast aluminum may be used for the engine block, cylinder heads and pistons, thereby contributing to a considerable decrease in weight. These factors, together with the smaller size, gives a tremendous advantage in weight compared to conventional engines. For example, an 8-cylinder engine of this new design will weigh approximately one-fourth less than a standard conventional engine of equivalent power output.

With an engine of this new design having 16-cylinders, the displacement will be doubled, giving only a 20% increase in size and weight with about a 100% increase in power output compared with a corresponding 8-cylinder engine.

In a 402 cubic inch V-8 conventional engine, the bore is 4.00" and the stroke is 4.00" which equals 2.00" of leverage from the center line of the crankshaft to the center line of the connecting rod. This gives 6.283" travel at 180° revolution of the crankshaft. The V-8 engine has a 2/1 ratio crankshaft to cam shaft. One revolution of the crankshaft completes two cycles which means four cylinders fire per revolution. Thus the crankshaft uses 180° of rotation with 4.00" of stroke each cycle and 2.00" of leverage.

In contrast, a piston engine of this new design having a 4.00" bore and 4.00" stroke has 5.55" of leverage or 5.55/2 or 2.775 times that of the V-8 engine. By combining the leverage and distance factors, the rotary engine has 2.775×2.755 or 7.645/1 advantage over the V-8 engine.

It is estimated that a 400 cubic inch displacement engine of this new design will give greatly improved mileage in comparison to that presently obtained by conventional 400 cubic inch displacement engines. Therefore this new engine has a vast improvement in economy and power compared to corresponding displacement in conventional automobile engines.

While the arrangement of the cam drum with respect to the cam lobe and the mainshaft as shown in the drawings and as described above is preferred and is considered more practical and efficient, it is also contemplated that the cam drum may be omitted fom its intermediate position between the mainshaft and the cam lobe. If desired, one or more cam drums may be attached to the mainshaft in a different location to provide harmonic balance and to provide support for the cam plates to be attached to the ends thereof, on which cam plates the ridge risers may be located for actuating the valve lifters for the intake and exhaust operations. Moreover, it is contemplated that the cam plates on which the said valve lifter actuating ridge risers are located may be plates or discs separated from the cam drum but still concentric with and attached to the mainshaft. Furthermore, the cam plates may actually be disc bolted, welded or otherwise fastened to the ends of the cam drum thereby facilitating flexibility in the design, replacement and location of the valve lifter ridge risers.

Nevertheless the design shown in the drawings whereby the cam drum is intermediate between the cam lobe and the mainshaft is preferred since this location requires less space on the mainshaft and provides flywheel action and harmonic balance. Moreover, the cam drum may be solid or partially hollow in accordance with its size and its desired effect.

Also, in the modification shown in FIG. 29, the shaft supporting bearing 6' is preferably extended to support a counter-rotation bearing (not shown) to prevent twisting. This counter-rotation bearing will fit in a groove running parallel to the axis of piston rod 4, 5.

The cam described herein with specially designed sinusoidal surfaces of the cam lobe is considered to be novel per se. Prior art methods of making cams are similar to the method described in "Machinery's Handbook", pp. 631–637, 15th edition, published by The Industrial Press, New York, N.Y. There is no teaching in the prior art of the ratio compensation features described herein. There are described above methods for determining the exact shape or slope of the sinusoidal curves in various bearing-contact areas of cam or cam lobes.

There have also now been found a simple process and apparatus for producing cams having cam lobes with the sinusoidal surfaces having the ratio compensation features described above. The process and apparatus are based on the fact that a cutting tool or grinder having the same radius as the bearing to be used on such surfaces will act in the same manner with respect to straight line and spiral line contacts with corresponding variances, and will therefore cut the sinusoidal surfaces correspondingly.

In this process and apparatus a cutting tool or grinding wheel is selected having the same radius as the bearing which will be used against the cam surface. The cutting or grinding tool is held in a stationary position, for example vertically, while being rotated and a cylindrical cam is advanced toward and retracted from the cutting or grinding tool while the cam is rotated on its axis which is positioned horizontally or at a 90° angle with the axis of the cutting or grinding tool. The rotation of the cam is correlated with the advancement of the cam toward the cutting or grinding tool so that the advancement and retraction will each occur twice during one revolution of the cam.

The gradual advancement and then retraction of the cam with respect to the cutting tool (or the grinding tool) eventually results in a smooth cutting of two reverse rises into the end of the cam. The apparatus holding the cam and the mechanism causing its rotation as well as its advancement and retraction are all positioned on a supporting structure that can be moved manually or mechanically in a horizontal direction, for example, by a threaded device. Since the cutting or grinding should be effected gradually, the movement of the supporting structure is effected gradually to accommodate the depth of each cut. Moreover the total sideward movement of the cam during its rotation corresponds to the depth of the reverse rise to be cut into the cam. At the sites of the two rises the cam is fully retracted so that there is little or no cutting at these exact positions. Then at the positions of the reverse rises the advancement is at its maximum.

Therefore initially the position of the supporting structure is such that the maximum advancement of the cam toward the cutting tool causes a small cutting at the reverse rise positions that will accommodate the capacity of the cutting tool. Then periodically the supporting structure is advanced incrementally in the direction of the cutting tool so that new cuts of the appropriate depth are made. Therefore as these incremental advancements are made the cutting at the reverse rise positions become deeper and deeper with corresponding increases in depth being made between the reverse rise and the adjacent rises.

When the appropriate depth has been effected in the reverse rises the cam may be reversed and positioned for cutting on the opposite sie of the lobe with the reverse rises on this new side being registered directly opposite the rises on the first side or the cutting tool may be repositioned to the opposite side of the cam. Then the foregoing procedure is repeated to complete formation of the opposite sinusoidal curve. The distance between a rise on one side and the opposite reverse rise should correspond to the distance between bearings on a particular connecting rod plus a small amount, such as 0.002" to allow for clearance.

To save a considerable amount of cutting or grinding it is convenient to use a model, even one made of wood, and preferably made by the above techniques, to form a mold from which castings of the desired metal may be made. Then cutting or grinding may be effected on such a preformed casting to give the exact dimensions and shape desired.

In the top view shown in FIG. 31 and the side elevational view of FIG. 32, cutting tool 43 is actuated and supported by arm 44 extending downward from the driving machine (not shown). The cutting tool 43 is supported from above and positioned to the left (in this modification and also as shown in FIG. 32) of cam 46 on which cam lobe 47 is being cut. Cam 46 is supported by and rotated with tightly fitting shaft 48. Shaft 48 passes through an axial opening in the cam 46 and extends from housing 49 and identified on the other side as shaft 48' which is rotatably supported by supporting frame 45 through which shaft 48' is free to move horizontally in the same direction as cam 46. Inside housing 49 there are a series of gears 50, 50' and 50" which impart the desired rate of rotation to shaft 48 and thereby to cam 46 and cam lobe 47. Axle 51 drives the gear 50″ which by appropriate gear ratios to gears 50′ and 50 impart the desired rate of rotation. Shaft 51 is driven by gear 52 which in turn is driven by gear 53. Gear 53 is driven by electric motor 54 through pulley 55 and pulley wheels 56 and 57. The gear ratio between gears 53 and 52 are appropriate to translate the motor speed to the desired rate of rotation for gears 50, 50′ and 50″. Shaft 51 has gear wheel 58 attached thereto which meshes with gear wheel 59 which is rigidly fixed to wheel 60. Wheel 60 has a pin 61 extending therefrom to engage arm 62 which in turn is pivotally affixed to shaft 48 by pivotal connector 64 so that as wheel 60 is rotated, pin 61 effects a forward and backward motion of arm 62 and thereby through the ball joint 63 transmits forward and backward motion to shaft 48. Shaft 48 extends slidably through gear wheel 50 and by a spline arrangement is rotated thereby. Shaft 48 extends through an axial opening in cam 46 and by a tight fit effects a corresponding movement therewith to the left and then backward to the right. This backward and forward movement corresonds to the diameter of the circle described by pin 61 on wheel 60. The ratios of the various gears are such that there are two revolutions of wheel 60 per revolution of cam 46 and cam lobe 47.

As shown in FIG. 32, all of the above apparati except for the cutting tool 43 and its driving and supporting mechanism is supported by plate 65 slidably mounted on base 66 which is supported by legs (which are not shown). Plate 65 is capable of being advanced to the left and retracted by an interior screw device (not shown) which is actuated by turning either handle 67 or handle 68 in the appropriate clockwise or counterclockwise direction.

FIG. 33 is a cut-away section of a portion of FIG. 32 showing the arrangement of gear wheel 58 which drives gear wheel 59 on top of which is wheel 60. Wheel 60 has a pin 61 extending upward and fitted into an opening of arm 62 so that arm 62 is driven to the left and then retracted to the right as the wheel 60 is rotated. As shown in FIG. 32, the forward and backward movement of arm 62 causes a forward and backward movement of arm 48 to which it is connected by pivotal connection 64.

As shown in FIG. 34, which is a cross-sectional view taken at line 34—34 of FIG. 32, shaft 48 is slidably mounted as a spline shaft through a spline driving gear in the interior of gear wheel 50 so that it will be rotated by rotation of gear wheel 50 simultaneously with its forward movement to the left and its backward movement to the right as effected by corresponding movement of rod 62. Splines 69 on rod 48 insure rotation of rod 48 with rotation of wheel 50. This rotation of shaft 48 effects the rotation of cam 46 and cam lobe 47. As previously indicated, the respective gears are selected of appropriate size to give exactly two revolutions of gear wheel 59 and attached wheel 60 per each revolution of gear wheel 50 and cam 46 and cam lobe 47. In this way the cam lobe has been advanced twice per revolution to form the reverse rises and has been twice retracted per revolution to form the rises. While other gear arrangements may be utilized for this purpose, it is essential that this ratio of two revolutions of the wheel causing sideward movement of the cam and cam lobe per revolution of the cam and cam lobe on their axis is essential for the production of a cam lobe having two rises and two reverse rises.

Moreover where it is desired to produce a cam lobe having one rise and one reverse rise the gear arrangement is such as to effect one forward and backward movement of the cam and cam lobe per revolution thereof. Where it is desired to have three rises and three reverse rises per cam lobe, it will require gear wheel arrangements to give three forward and three backward movements per revolution of the cam lobe. Furthermore, while gear wheels are preferred for effecting the movements described, other equivalent means for effecting appropriate numbers of sideward movements per revolution of the cam lobe may be used.

FIG. 35 shows how both sides of the cam lobe are cut or ground. While it is preferred to cut one side of the lobe at a time, it is possible by proper adjustments and spacing to cut or grind both sides simultaneously. However in FIG. 35, cutter 43 is shown positioned to cut the first side of cam lobe 47 and later, after this first side is finished, the cutting tool will be changed to one cutting in the reverse direction and positioned on the opposite side of the lobe with the sideward movements of the lobe adjusted and registered appropriately.

Where it is desired to cut a groove in the cam as shown in FIGS. 29 and 30, wherein the sinusoidal surfaces are the sidewalls of the groove, the cutting tool 43 shown in FIGS. 31 and 32 is raised and positioned above an uncut cylindrical cam. For this purpose the cutting tool has cutting edges on the bottom as well as on its side (cylindrical) surface. The cutting tool is then incrementally lowered about 1/16 of an inch per one or more revolutions of the cam, or any other incremental distance which is within the cutting capacity of the tool. As the cylindrical cam oscillates in accordance with the advancement and retraction described above, the groove is gradually cut into the cam simultaneously increasing the depth and cutting the sidewalls to provide sidewalls having the sinusoidal surfaces described above. In each sidewall the sinusoidal surface at the outer edge of the cylinder has a lesser slope than at depths farther into the cylinder toward the axis of the cylinder with the slope increasing gradually until the greatest slope is at the innermost part of the groove. The cutting tool has a diameter equal to the bearing which is to be used in the groove as illustrated in FIG. 29. Preferably a small clearance such as about 0.003 inch, is provided to allow for lubrication and clearance.

Moreover, where it is desirbed to alter the face of the cam to change or vary performance of the cam, such as for high revolutions per minute, an eccentric device may be added to wheel 60 and connector 61 to alter the waveform of the cam lobe surface. However, for use in the engine herein described, the cam lobe described above is preferred.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

THE INVENTION CLAIMED IS:
1. In a multiple cylinder engine comprising:
 a. a mainshaft;
 b. a cam lobe extending outwardly from the cylindrical periphery of said mainshaft; said lobe having its outer annular periphery substantially cylindrical in shape concentric with said mainshaft and having two opposite sinusoidal surfaces extending near the annular surface of said cam lobe, each of said sinusoidal surfaces having two rises at points 180° from each other and each sinusoidal surface having two reverse rises at points 90° from each of said rises with curved surfaces connecting said rises with said reverse rises on the same sinusoidal surface, the rises in one of said sinusoidal surfaces being opposite the reverse rises in the other of said sinusoidal surfaces and the reverse rises in one of said sinusoidal surfaces being opposite the rises in the other of said sinusoidal surfaces;

c. a multiplicity of pairs of enclosed cylindrical openings having their respective axes parallel to and positioned in a circle around the axis of said mainshaft with the two cylindrical openings in each pair having a common axis and an open end facing each other and having the other ends of said cylinders closed;

d. a corresponding number of pistons with a piston positioned in each said cylinder;

e. a series of connecting rods, the individual connecting rod connecting the two pistons in each respective pair of cylinders, with the length of each said connectng rod being of a length to reach one piston while that piston is positioned to give its cylinder maximum unoccupied volume and to reach the other piston of said pair while said other piston is in a position to give its cylinder minimum unoccupied volume;

f. a multiplicity of cylindrical bearings connected to said connecting rods and each positioned against one or the other of said sinusoidal surfaces so that when either of the pistons attached to the piston rod to which said bearing is attached moves it wIl cause a bearing to press against one of said sinusoidal surfaces, said cylindrical bearings being arranged so that two of said bearings are attached to each connecting rod, spaced from each other and positioned so that the two bearings on a connecting rod are on opposite sides of said cam lobe with one bearing being adjacent to one of said sinusoidal surfaces of said cam lobe and the other of said two bearings being adjacent to the other of said sinusoidal surfaces of said cam lobe, each bearing being positioned so that when the piston to which it is more closely attached is moving toward said cam lobe that bearing will be pressed against the adjacent sinusoidal surface of said cam lobe;

g. a power means for sequentially moving one of each pair of said pistons along the path of its linear axis and thereafter alternately moving the other piston of said pair in the opposite direction, whereby the sequential pressure of said bearings on said sinusoidal surfaces will cause a rotation of the mainshaft on its linear axis;

the improvement wherein the contact areas of said cam lobe surfaces with said bearings are designed so that the area in contact with the outer edge or that edge of the bearing farthest from the axis of said manishaft has a lesser slope in the sinusoidal surface between each said rise and the adjacent reverse rises as compared with the greater slope in the cam lobe surface area in contact with the inner edge of said bearing or that edge of the bearing closest to the axis of said mainshaft, with a gradual increase in said slope progressing from said outer edge contact area to said inner edge contact area, whereby imaginary planes passed through and coincident with the axis of said mainshaft intercept the cam lobe at various angles around the periphery of said lobe, with the cross-section of the bearing contact areas of the cam lobe at the respective rises and reverse rises comprising at the outer surfaces of the cam three sides of a rectangular shape and the respective cross-sections at the midway points between a rise and an adjacent reverse rise comprising three sides of substantially a truncated trapezoid with the bottom line of said trapezoid being in the annular periphery of said cam lobe and with the wider portion of the said trapezoid being the portion of the cam lobe with which the outer edges of said bearings come into contact, with the cross-sections intermediate between said midway cross-section and each said rise cross-section or reverse rise cross-section changing gradually from substantially a truncated trapezoid to said rectangular shape as the respective planes progress from said midway point to a rise or reverse rise.

2. The engine of claim 1, in which the midpoint of the bearing axis is positioned substantially on the centerline running through each pair of pistons with the axis of the bearing being at a substantially 90° angle with the piston centerline so that centerline thrust is effected by each bearing onto the surface of said cam lobe.

3. The engine of claim 1, in which a cylinder drum concentric with and surrounding a portion of said mainshaft is positioned between and attached to both said mainshaft and said cam lobe.

4. The engine of claim 1, in which said power means comprises a combustion system whereby each said cylinder is equipped with intake means, exhaust means and sparking means and is adapted to take in a fuel-air mixture, compress said mixture, to spark and fire said mixture, to exhaust the combustion products therefrom and to repeat said procedure continuously to produce power from the movement of the piston in said cylinder during said firing.

5. The engine of claim 4, in which the two ends of said cylindrical drum have two circular ridges, each of said circular ridges being concentric with said mainshaft and being adapted to have grooved wheels ride thereon.

6. The engine of claim 5, which has two grooved wheels, one grooved wheel adapted to ride on one of said ridges and the other of said grooved wheels adapted to ride on the other of said ridges, said grooved wheels being rotatably connected to supporting and activating means whereby upward movement of either of said grooved wheels in its course on said ridges will cause said activating means to open a valve in the closest of said cylinders to which it is positioned, each of said ridges having one or more rises which will push the corresponding wheel riding on said ridge to a raised position for a predetermined distance in its circular path on said ridge.

7. The engine of claim 6, in which said rise on one of said ridges is of sufficient length to open by its corresponding activating means for an appropriate time the intake valve in the closest positioned of said cylinders and said rise on the other of said ridges is of sufficient length to open by its corresponding activating means for an appropriate time the exhaust valve in the closest positioned of said cylinders.

8. The engine of claim 1, adapted to serve as a compressor in which the closed end of one or more of said cylinders is equipped with both an inlet and an outlet valve whereby the revolution of said mainshaft on its linear axis is adapted to cause the movement of said piston in said cylinder which piston movement is adapted to cause a gas to be drawn into said cylinder through said inlet valve when the piston in said cylinder moves away from said closed end and is adapted to compress said gas and cause said gas to be exhausted through said outlet valve when said piston is moved toward said closed end.

9. The engine of claim 8, in which less than the total number of said cylinders are adapted to draw in and compress said gas and the remainder of said cylinders are adapted to operate as a power supplying means for rotating said mainshaft.

10. The engine of claim 8, in which all of said cylinders are adapted to draw in and compress said gas and the driving force for rotating said mainshaft is supplied from outside said engine.

11. In a multiple cylinder engine comprising:
   a. a mainshaft;
   b. a cam lobe extending outwardly from the cylindrical periphery of said mainshaft; said lobe having its outer annular periphery substantially cylindrical in shape concentric with said mainshaft and having two opposite sinusoidal surfaces extending near the annular surface of said cam lobe, each of said sinusoidal surfaces having two rises at points 180° from each other and each sinusoidal surface having two reverse rises at points 90° from each of said rises with curved surfaces connecting said rises with said reverse rises on the same sinusoidal surface, the rises in one of said sinusoidal surfaces being opposite the reverse rises in the other of said sinusoidal surfaces and the reverse rises in one of said sinusoidal surfaces being opposite the rises in the other of said sinusoidal surfaces;
   c. a multiplicity of pairs of enclosed cylindrical openings having their respective axes parallel to and positioned in a circle around the axis of said mainshaft with the two cylindrical openings in each pair having a common axis and an open end facing each other and having the other ends of said cylinders closed;
   d. a corresponding number of pistons with a piston positioned in each said cylinder;
   e. a series of connecting rods, the individual connecting rods connecting the two pistons in each respective pair of cylinders, with the length of each said connecting rod being of a length to reach one piston while that piston is positioned to give its cylinder maximum unoccupied volume and to reach the other piston of said pair while said other piston is in a position to give its cylinder minimum unoccupied volume;
   f. a multiplicity of cylindrical bearings connected to said connecting rods and each positioned against one or the other of said sinusoidal surfaces so that when either of the pistons attached to the piston rod to which said bearing is attached moves it will cause a bearing to press against one of said sinusoidal surfaces, said cylindrical bearings being arranged so that two of said bearings are attached to each connecting rod, spaced from each other and positioned so that the two bearings on a connecting rod are on opposite sides of said cam lobe with one bearing being adjacent to one of said sinusoidal surfaces of said cam lobe and the other of said two bearings being adjacent to the other of said sinusoidal surfaces of said cam lobe, each bearing being positioned so that when the piston to which it is more closely attached is moving toward said cam lobe that bearing will be pressed against the adjacent sinusoidal surface of said cam lobe;
   g. a power means for sequentially moving one of each pair of said pistons along the path of its linear axis and thereafter alternately moving the other piston of said pair in the opposite direction whereby the sequential pressure of said bearings on said sinusoidal surfaces will cause a rotation of the mainshaft on its linear axis;

the improvement wherein the contact areas of said cam lobe surfaces with said bearings are designed so that the area in contact with the outer edge or that edge of the bearing farthest from the axis of said mainshaft has a lesser slope in the sinusoidal surface between each said rise and the adjacent reverse rises as compared with the greater slope in the cam lobe surface area in contact with the inner edge of said bearing or that edge of the bearing closest to the axis of said mainshaft, with a gradual increase in said slope progressing from said outer edge contact area to said inner edge contact area, whereby the line of contact of each said bearing with said cam lobe surface comprises a straight line on the cylindrical bearing surface when the bearing is positioned at a rise or reverse rise and at intermediate points between a rise or reverse rise the line of contact of the surface of a bearing with the cam lobe surface varies from said straight line contact to an askew line spiraling around on the cylindrical surface away from such straight line contact with the variance from straight line contact increasing gradually from the straight line at a rise or reverse rise to a maximum variance at the midway point between a rise or reverse rise and the adjacent reverse rise or rise respectively, and then decreasing gradually in said variance from said midway point to the next reverse rise or rise.

12. In a multiple cylinder engine comprising:
   a. a mainshaft;
   b. a cam lobe extending outwardly a substantial distance from the cylindrical periphery of said mainshaft; said lobe having its outer annular periphery substantially cylindrical in shape concentric with said mainshaft and having a sinusoidal groove cut in the annular surface of said cam lobe, the sidewalls of said groove comprising two opposite sinusoidal surfaces extending near the annular surface of said cam lobe, each of said sinusoidal surfaces having two rises at points 180° from each other and each sinusoidal surface having two reverse rises at points 90° from each of said rises with curved surfaces connecting said rises with said reverse rises on the same sinusoidal surface, the rises in one of said sinusoidal surfaces being opposite the reverse rises in the other of said sinusoidal surfaces and the reverse rises in one of said sinusoidal surfaces being opposite the rises in the other of said sinusoidal surfaces;
   c. a multiplicity of pairs of enclosed cylindrical openings having their respective axes parallel to and positioned in a circle around the axis of said mainshaft with the two cylindrical openings in each pair having a common axis and an open end facing each other and having the other ends of said cylinders closed;
   d. a corresponding number of pistons with a piston positioned in each said cylinder;
   e. a series of connecting rods, the individual connecting rods connecting the two pistons in each respective pair of cylinders, with the length of each said connecting rod being of a length to reach one piston while that piston is positioned to give its cylinder maximum unoccupied volume and to reach the other piston of said pair while said other piston is in a position to give its cylinder minimum unoccupied volume;

f. a multiplicity of cylindrical bearings comprising a series of individual bearings, each individually attached to one of said connecting rods and positioned to extend into said groove, and adapted to bear alternately against one or the other of said sinusoidal surfaces; each bearing being positioned so that when one of the pistons, to which it is connected by means of the attached connecting rod, is moving toward said cam lobe that bearing will be pressed against one or the other of said sinusoidal surfaces of said sinusoidal groove;

g. a power means for sequentially moving one of each pair of said pistons along the path of its linear axis and thereafter alternately moving the other piston of said pair in the opposite direction, whereby the sequential pressure of said bearings on said sinusoidal surfaces will cause a rotation of the mainshaft on its linear axis;

the improvement wherein the contact areas of said cam lobe surfaces with said bearings are designed so that the area in contact with the outer edge or that edge of the bearing farthest from the axis of said mainshaft has a lesser slope in the sinusoidal surface between each said rise and the adjacent reverse rises as compared with the greater slope in the cam lobe surface area in contact with the inner edge of said bearing or that edge of the bearing closest to the axis of said mainshaft, with a gradual increase in said slope progressing from said outer edge contact area to said inner edge contact area whereby the line of contact of each said bearing with said cam lobe surface comprises a straight line on the cylindrical bearing surface when the bearing is positioned at a rise or reverse rise and at intermediate points between a rise or reverse rise the line of contact of the surface of a bearing with the cam lobe surface varies from said straight line contact to an askew line spiraling around on the cylindrical surface away from such straight line contact with the variance from straight line contact increasing gradually from the straight line at a rise or reverse rise to a maximum variance at the midway point between a rise or reverse rise and the adjacent reverse rise or rise respectively, and then decreasing gradually in said variance from said midway point to the next reverse rise or rise.

13. The engine of either of claims 11 or 12 adapted to serve as a compressor in which the closed end of one or more of said cylinders is equipped with both an inlet and an outlet valve whereby the revolution of said mainshaft on its linear axis is adapted to cause a gas to be drawn into said cylinder through said inlet valve when said cylinder moves away from said closed end and is adapted to compress said gas and cause said gas to be exhausted through said outlet valve when said piston is moved toward said closed end.

14. The engine of either claims 11 or 12 in which the midpoint of the bearing axis is positioned substantially on the centerline running through each pair of pistons with the axis of the bearing being at a substantially 90° angle with the piston centerline so that centerline thrust is effected by each bearing onto the surface of said cam lobe.

* * * * *

UNITED STATES PATENT AND TRADEMARK OFFICE
CERTIFICATE OF CORRECTION

PATENT NO. : 4,432,310
DATED : February 21, 1984
INVENTOR(S) : Francis E. Waller It is certified that error appears in the above-identified patent and that said Letters Patent is hereby corrected as shown below:

On cover sheet, the Assignee should read: -- Leonard J. E. Waller, William J. Gdorin and Walter J. Monacelli, part interest. --.

Col. 2, line 53, correct "otuer" to read "other".
Col. 3, line 7, correct "impotant" to read "important".
Col. 3, line 25, correct "xmple" to read "example".
Col. 3, line 59, correct "mwethod" to read "method".
Col. 4, line 11, after "that" insert "the".
Col. 4, line 12, correct "trangular" to read "triangular".
Col. 4, line 22, correct "elevationsl" to read "elevational".
Col. 4, line 23, correct "18" to read "19".
Col. 5, lines 50 and 53, correct "circmferential" to read "circumferential".
Col. 6, line 11, correct "roates" to read "rotates".
Col. 7, line 48, correct "circle" to read "circular".
Col. 9, line 14, correct "enlarge" to read "enlarged".
Col. 9, line 45, correct "form" to read "from".
Col. 9, line 64, after "to" insert "a".
Col. 13, line 2, before "inch" (1st appearance) insert "0.1825".
Col. 14, lines 5 and 6, correct "preformed" to read "performed".
Col. 14, line 29, correct "delivery" to read "deliver".
Col. 15, line 41, correct "pistions" to read "pistons".
Col. 16, line 38, correct "8f" to read "26f".

UNITED STATES PATENT AND TRADEMARK OFFICE
CERTIFICATE OF CORRECTION

PATENT NO. : 4,432,310
DATED : February 21, 1984
INVENTOR(S) : Francis E. Waller It is certified that error appears in the above-identified patent and that said Letters Patent is hereby corrected as shown below:

Col. 16, line 66, correct "conact" to read "contact".

Col. 17, line 6, correct "8a" to read "26a" and "8i" to read "26i".

Col. 17, line 11, correct "8" to read "26a" and "8i" to read "26i".

Col. 17, line 59, correct "outer" to read "other".

Col. 19, line 12, correct "fom" to read "from".

Col. 20, line 38, correct "sie" to read "side".

Col. 22, line 47, correct "desirbed" to read "desired".

Col. 23, line 34, correct "wll" to read "will".

Col. 23, line 59, correct "manishaft" to read "mainshaft".

Col. 26, line 68, correct "pistions" to read "pistons".

Signed and Sealed this

Fourth Day of September 1984

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 4,432,310

DATED : February 21, 1984

INVENTOR(S) : Francis E. Waller

It is certified that error appears in the above-identified patent and that said Letters Patent is hereby corrected as shown below:

On the title page, in the paragraph headed "Related U.S. Application Data" after "abandoned", add -- which is a continuation of application Serial No. 35,553 filed May 3, 1979. --

Signed and Sealed this

Tenth Day of February, 1987

Attest:

DONALD J. QUIGG

Attesting Officer

Commissioner of Patents and Trademarks